United States Patent
Kittaka et al.

(10) Patent No.: US 7,260,300 B2
(45) Date of Patent: *Aug. 21, 2007

(54) WAVEGUIDE ELEMENT USING PHOTONIC CRYSTAL

(75) Inventors: Shigeo Kittaka, Osaka (JP); Kazuaki Oya, Osaka (JP); Masatoshi Nara, Osaka (JP); Keiji Tsunetomo, Osaka (JP); Takahiro Asai, Osaka (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/547,535

(22) PCT Filed: Mar. 4, 2004

(86) PCT No.: PCT/JP2004/002749

§ 371 (c)(1),
(2), (4) Date: Aug. 31, 2005

(87) PCT Pub. No.: WO2004/081626

PCT Pub. Date: Sep. 23, 2004

(65) Prior Publication Data

US 2006/0078263 A1   Apr. 13, 2006

(30) Foreign Application Priority Data

Mar. 4, 2003   (JP) .............................. 2003-056549

(51) Int. Cl.
*G02B 6/10* (2006.01)
(52) U.S. Cl. ....................... 385/129; 385/132
(58) Field of Classification Search ......... 385/129–132
See application file for complete search history.

(56) References Cited

U.S. PATENT DOCUMENTS 6,134,043 A   10/2000   Johnson et al.
6,597,721 B1 *   7/2003   Hutchinson et al. .......... 372/98

(Continued)

FOREIGN PATENT DOCUMENTS

EP   1 039 561   9/2000

(Continued)

OTHER PUBLICATIONS

Ohashi, et al., "Latest Technological Trend of Communication Optical Fiber", O Plus E, vol. 23, No. 9, pp. 1061-1066, 2001 (w/partial translation).

(Continued)

*Primary Examiner*—Sung Pak
*Assistant Examiner*—Daniel Petkovsek
(74) *Attorney, Agent, or Firm*—Hamre, Schumann, Mueller & Larson, P.C.

(57) ABSTRACT

In a waveguide element using a photonic crystal including a core formed of a photonic crystal having a refractive index periodicity in at least two directions perpendicular to a propagation direction of an electromagnetic wave and a cladding arranged in contact with the core in order to confine the electromagnetic wave in the core, an incident side phase modulation portion is provided for allowing an electromagnetic wave that is coupled to a band on or near a Brillouin zone boundary in a photonic band structure in the core and propagates in the core to enter the core.

19 Claims, 22 Drawing Sheets

U.S. PATENT DOCUMENTS

| | | | |
|---|---|---|---|
| 6,813,399 B2 * | 11/2004 | Hamada | 385/11 |
| 6,901,194 B2 * | 5/2005 | Charlton et al. | 385/122 |
| 6,937,781 B2 * | 8/2005 | Shirane et al. | 385/16 |
| 2002/0027655 A1 | 3/2002 | Kittaka et al. | |
| 2002/0060847 A1 | 5/2002 | Joannopoulos et al. | |
| 2003/0142385 A1 | 7/2003 | Kittaka et al. | |
| 2003/0184845 A1 | 10/2003 | Kittaka et al. | |
| 2004/0008437 A1 | 1/2004 | Kittaka et al. | |

FOREIGN PATENT DOCUMENTS

| | | |
|---|---|---|
| EP | 1 211 531 | 6/2002 |
| EP | 1 248 123 | 10/2002 |
| JP | 2001-51244 | 2/2001 |
| JP | 2002/236206 | 8/2002 |
| JP | 2003/215362 | 7/2003 |
| JP | 2003/287633 | 10/2003 |
| WO | 03/079071 | 9/2003 |

OTHER PUBLICATIONS

Knight, et al., "New regimes for fiber optics using photonic crystal fiber", Optical Society of America Annual Meeting 2002, Conference Program, WA 3, p. 94, 2002.

Joannopoulos, et al., "Computing Photonic Band Structures", Photonic Crystals, Princeton University Press, 1995.

Plihal, et al., "Photonic band structure of two-dimensional systems: The triangular lattice", Physical Review B, vol. 44, No. 16, p. 8565, 1991.

Fink, et al., "Multilayered photonic bandgap fibers for high-power laser applications", Photonics West, Technical Summary Digest, C4993-04, p. 383, 2003.

Optical Fiber Communication 2002, Technical Digest, ThK4, p. 468-469.

Shoten, et al., Microoptics Handbook, p. 224 (w/partial translation).

Kittaka, et al., "Simulations of wave propagation in one-dimensional photonic crystals", The Japan Society of Applied Physics, 2a-ZN-1, p. 949, 2003 (w/partial translation).

Yeh, P., et al., "Electromagnetic propagation in periodic stratified media. I. General theory", *Optical Society of America*, vol. 67, No. 4, pp. 423-438 (1977).

* cited by examiner

WAVEGUIDE ELEMENT USING PHOTONIC CRYSTAL

TECHNICAL FIELD

The present invention relates to a waveguide element for controlling electromagnetic waves and, in particular, to a waveguide element using a photonic crystal structure used for an optical communication system or the like.

BACKGROUND ART

In recent years, research and development of new optical fibers referred to as holey fibers, photonic crystal fibers (PCFs) or photonic band gap fibers (PBFs) have progressed at a dramatic pace. In conventional optical fibers, the light is confined to the core by a simple refractive index difference. In contrast, these new optical fibers are characterized by having a complex two-dimensional structure in their cross section.

In other words, the light is confined by means of establishing a refractive index difference between the cladding and the core by arranging holes in the cladding to reduce the effective refractive index in the cladding (holey fibers, PCFs), or of forming a photonic band gap with respect to the propagation light in the core by making the cladding of a photonic crystal (PBFs).

It is possible to change the characteristics of PCFs and PBFs considerably through their structure, so that applications such as "dispersion compensation optical fibers with increased wavelength dispersion", "optical fibers with large non-linear optical effects" and "zero dispersion optical fibers with zero dispersion in the visible spectrum" have been proposed. Moreover, the complex two-dimensional structures can be fabricated, for example, by heating and stretching a large number of quartz glass pipes that are bundled together (see Masaharu Ohashi, "Latest Technological Trend of Communication Optical Fiber", O plus E, 2001, vol. 23, No. 9, p.p. 1061-1066, for example). Also, fibers utilizing a photonic crystal as the core have been proposed recently (see J. C. Knight and three others, Optical Society of America Annual Meeting 2002, Conference Program, 2002, (US), WA 3, p. 94, for example).

In most of the PCFs and PBFs that have been proposed so far, single mode propagation with the 0-th mode is used for electromagnetic waves propagating through the core. Even though single mode propagation is a necessary condition to prevent wavelength dispersion due to multi-mode propagation, it also poses restrictions with regard to the core size and the optical fiber performance.

On the other hand, it has been well known that the electromagnetic waves propagating through the photonic crystal have characteristic properties of "very large wavelength dispersion due to the anomalous band structure" and "group velocity anomaly of propagation light." However, the above-mentioned 0-th mode propagation light does not show such properties very strongly. Therefore, in order to achieve functions making use of these properties, it is necessary to extend the waveguide, causing problems of increasing production costs and propagation loss.

The inventors of the present invention have studied the propagation of electromagnetic waves inside the photonic crystals. For example, when plane wave light as incident electromagnetic wave is made to enter perpendicularly an end face of a one-dimensional photonic crystal having no periodicity in the propagation direction, propagation light in a plurality of photonic bands is generated depending on the frequency of the incident light. Among them, propagation light in the band that is not the lowest-order band (in the following, referred to as higher-order band propagation light) has the above-mentioned very large wavelength dispersion and group velocity anomaly, so that it can be applied to various optical elements.

However, regardless of the frequencies, a part of incident light energy always propagates as propagation light in the lowest-order band (corresponding to 0-th mode in a conventional optical fiber; in the following, referred to as first band propagation light). Since the first band propagation light has little effects of "very large wavelength dispersion" or "group velocity anomaly" described above, it merely is a noise in the case of utilizing the higher-order band propagation light. Consequently, the first band propagation light not only lowers the utilization efficiency of the incident light energy considerably but also causes a decrease in a S/N ratio of the waveguide as stray light.

DISCLOSURE OF INVENTION

The present invention was made for solving the problems described above, and the object of the present invention is to provide a waveguide element, including a fiber, that is constituted for exhibiting an effect specific to a photonic crystal sufficiently.

In order to achieve the above-mentioned object, in a waveguide element using a photonic crystal including a core formed of a photonic crystal having a refractive index periodicity in at least two directions perpendicular to a propagation direction of an electromagnetic wave, and a cladding arranged in contact with the core in order to confine the electromagnetic wave in the core, an incident side phase modulation portion is provided for allowing an electromagnetic wave that is coupled to a band on or near a Brillouin zone boundary in a photonic band structure in the core and propagates in the core to enter the core.

DESCRIPTION OF THE INVENTION

Figure 1A:
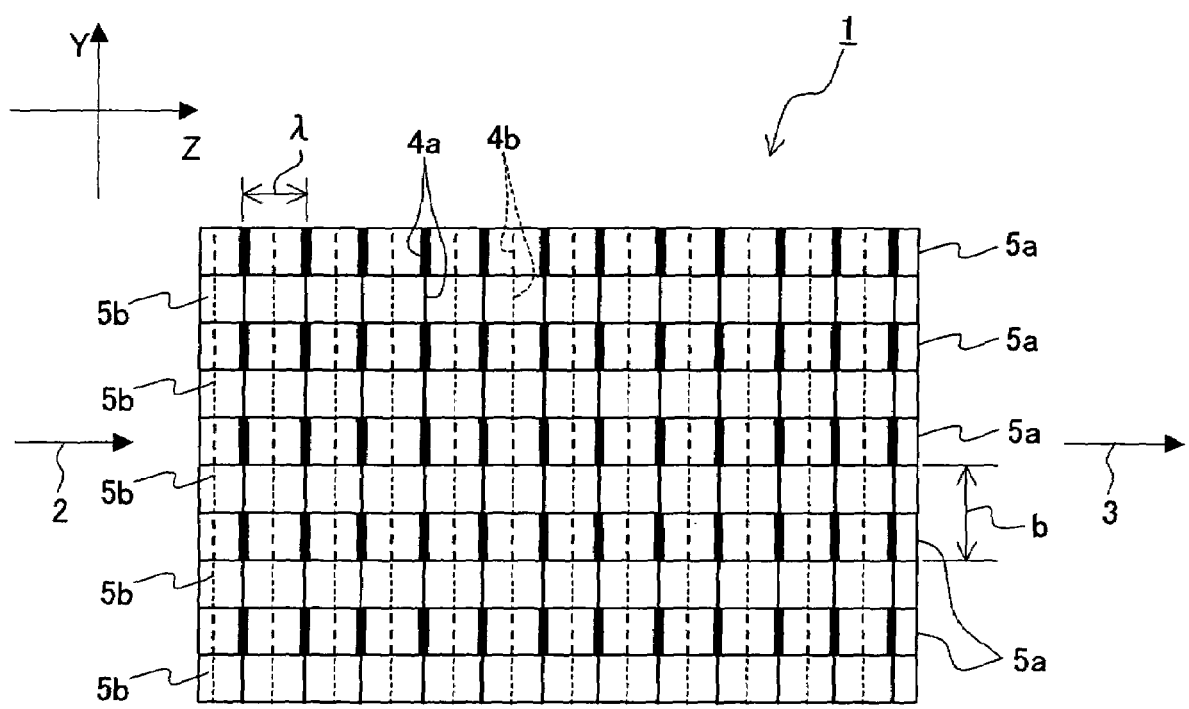
FIG. 1A is a sectional view schematically showing an intensity of an electric field of first band propagation light in the Z-axis direction in a one-dimensional photonic crystal.

By subjecting incident light to a phase modulation, a waveguide element using a photonic crystal according to an embodiment of the present invention utilizes photonic bands for propagation light, in particular, actively utilizes a band present on a boundary of the Brillouin zones. The propagation light present on the boundary of the Brillouin zones has a characteristic similar to a higher-order band propagation light even if it is the lowest-order band propagation light. Thus, the band present on the boundary of the Brillouin zones can be utilized for various optical elements. Further, not only light but also other electromagnetic waves may be used as propagation light, and the waveguide element according to the present invention also can be used as an electromagnetic wave control element.

Also, in the waveguide element using a photonic crystal according to the present embodiment, the incident side phase modulation portion allows an electromagnetic wave that entirely or mostly belongs to a single photonic band and propagates in the core to enter the core. In this way, the waveguide element using a photonic crystal according to the present embodiment can be used as optical control elements such as an optical delay element and a dispersion compensation element in optical communications.

Further, the photonic crystal serving as the core may have no refractive index periodicity in the propagation direction of the electromagnetic wave.

Moreover, the incident side phase modulation portion preferably may allow a substantially plane wave having an inclination angle with respect to an incident surface of the core to enter the core. In this way, a waveguide element utilizing propagation light in a band on the Brillouin zone boundary in the photonic crystal can be achieved. Consequently, it is widely applicable as elements utilizing a dispersion compensation and an effect of increased optical non-linearity due to a group velocity anomaly of the propagation light.

Furthermore, an incident surface of the core preferably may be inclined with respect to a plane perpendicular to the propagation direction of the electromagnetic wave, and the incident side phase modulation portion may allow a substantially plane wave to enter the core. In this way, a waveguide element utilizing propagation light in a band on the Brilloum zone boundary in the photonic crystal can be achieved. Consequently, it is widely applicable as elements utilizing a dispersion compensation and an effect of increased optical non-linearity due to a group velocity anomaly of the propagation light.

Additionally, it is preferable that, at an incident surface of the core, the incident side phase modulation portion allows an electromagnetic wave subjected to a phase modulation periodically into an in-plane direction parallel with the incident surface to enter the core. In this way, a waveguide element utilizing propagation light in a band on the Brillouin zone boundary in the photonic crystal can be achieved. Consequently, it is widely applicable as elements utilizing a dispersion compensation and an effect of increased optical non-linearity due to a group velocity anomaly of the propagation light.

Further, it is preferable that the incident side phase modulation portion allows a plurality of substantially plane waves to enter the incident surface of the core and allows the plurality of substantially plane waves to interfere with each other at the incident surface, thereby allowing the electromagnetic wave subjected to the phase modulation to enter the core. In this way, a waveguide element utilizing propagation light in a band on the Brillouin zone boundary in the photonic crystal can be achieved. Consequently, it is widely applicable as elements utilizing a dispersion compensation and an effect of increased optical non-linearity due to a group velocity anomaly of the propagation light.

Moreover, it is preferable that the incident side phase modulation portion includes a phase grating disposed at a position close to or in contact with the incident surface of the core, and an incident portion for allowing an electromagnetic wave to enter the phase grating. This makes it possible to generate propagation light in the band on the Brillouin zone boundary in the photonic crystal easily.

Furthermore, it is preferable that the phase grating is formed as one piece with the core. This allows easier production.

Additionally, it is preferable further to include an exit side phase modulation portion disposed at a position close to or in contact with an exit surface of the core from which an electromagnetic wave exits and that the exit side phase modulation portion converts the electromagnetic wave that exits from the core into a substantially plane wave. This allows a plane wave to exit.

Also, it is preferable that the exit side phase modulation portion is formed as one piece with the core. This allows easier production.

Further, the exit side phase modulation portion may have an identical structure with the incident side phase modulation portion and may be disposed such that a positional relationship between incident and exit ends of the exit side phase modulation portion is reversed from that of the incident side phase modulation portion.

Moreover, it is preferable that the cladding is a photonic crystal having a refractive index periodicity in at least one direction perpendicular to the propagation direction of the electromagnetic wave propagating in the core. This prevents guided light from leaking out, so that a low-loss waveguide element can be provided.

Furthermore, the cladding preferably may be the photonic crystal having no refractive index periodicity in the propagation direction of the electromagnetic wave propagating in the core.

Additionally, it is preferable that a waveguide portion constituted by the core and the cladding has a structure in which a plurality of parallel grooves are formed in a multilayered body having a plurality of periods, and the grooves are perpendicular to each layer in the multilayered body and run along the propagation direction of the electromagnetic wave. This makes it possible to produce the core and the cladding easily.

Also, it is preferable that the core is a homogeneous material in which a plurality of cavities extending along the propagation direction of the electromagnetic wave are formed, and the cavities are arranged so as to have a constant period in a plane perpendicular to the propagation direction of the electromagnetic wave. This makes it possible to produce the photonic crystal easily.

Furthermore, all or some of the plurality of cavities may be filled with a fluid material.

Moreover, all or some of the plurality of cavities may be filled with an active material having an optical non-linear effect.

In addition, it is preferable that the core has a fiber shape with a substantially circular cross-section. Accordingly, a waveguide element using a photonic optical fiber can be achieved.

The studies conducted by the inventors of the present invention have revealed that, in the case of a one-dimensional photonic crystal having a periodicity in the Y-axis direction and having no periodicity in the X-axis direction and the Z-axis direction, "when an appropriate phase modulation wave having a period b is allowed to enter a multilayer film layer having a period b in the same direction, it is possible to obtain only propagation light belonging to a specific higher-order band." When imagining an optical path reversely, it also is possible to provide a suitable phase modulation means behind an end face of the multilayer film layer, thus restoring the higher-order band propagation light into a plane wave. The following is a description of how to allow only the higher-order band propagation light to propagate through the photonic crystal by the phase modulation wave. Incidentally, the period b is equivalent to the thickness of a periodic structure serving as a basic unit of the periodically arranged multilayer film layer.

Figure 1B:
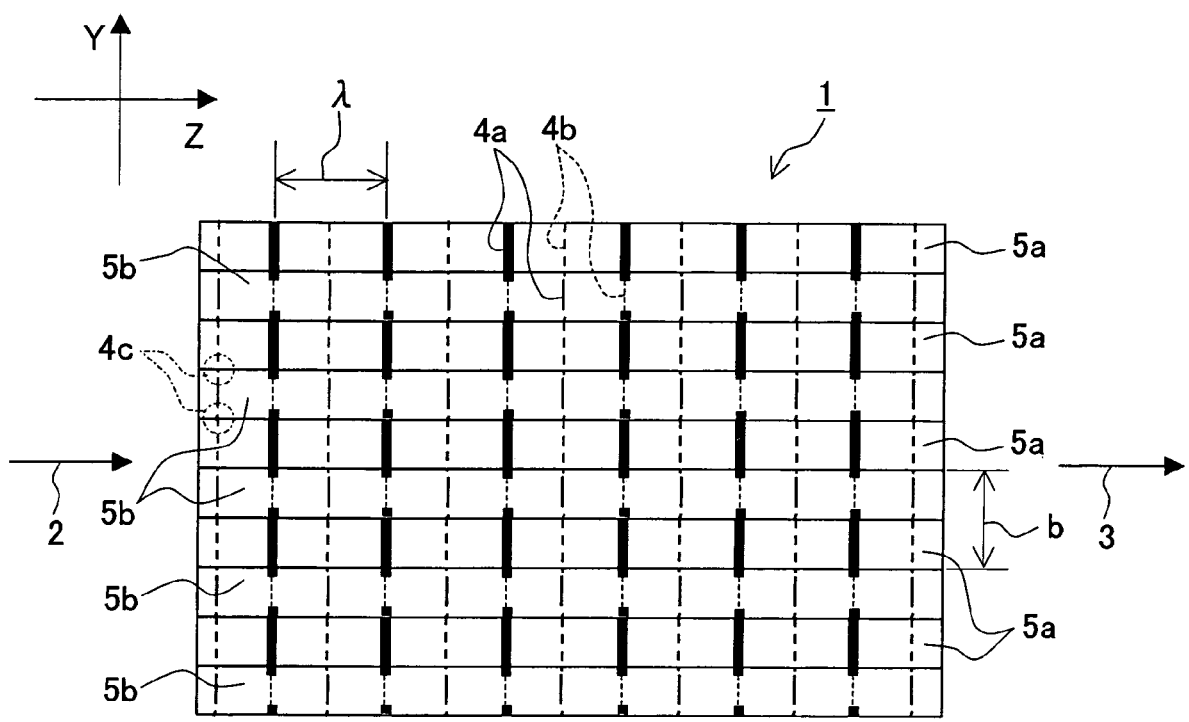
FIG. 1B is a sectional view schematically showing an intensity of an electric field of higher-order band propagation light in the Z-axis direction in the one-dimensional photonic crystal.

FIGS. 1A and 1B are sectional views schematically showing the intensity of an electric field of propagation light in a one-dimensional photonic crystal 1. FIG. 1A shows a cross-section of the one-dimensional photonic crystal 1 schematically showing the intensity of the electric field of first band propagation light in the Z-axis direction. FIG. 1B shows a cross-section of the one-dimensional photonic crystal 1 schematically showing the intensity of the electric field of higher-order band propagation light in the Z-axis direction. In FIGS. 1A and 1B, the one-dimensional photonic crystal 1 is a periodic multilayered body including materials 5a and 5b that are layered alternately. Incident light 2 enters the one-dimensional photonic crystal 1 from the left side, and outgoing light 3 leaves the one-dimensional photonic crystal 1 from the right side. The photonic crystal 1 has a refractive index that is periodic in the Y-axis direction and uniform in the Z-axis direction, which is a propagation direction of the propagation light.

The electric field of the light is depicted in the form of waves. In FIGS. 1A and 1B, wave crests 4a of the electric field are shown as solid lines, and wave troughs 4b of the electric field are shown as dashed lines. Moreover, the size of the amplitude is expressed by the thickness of those lines, and a thicker line represents a larger amplitude. It should be noted that the wavelength of the propagation light is $\lambda$.

As shown in FIG. 1A, even though the electric field amplitude of the first band propagation light in the material 5a differs from that in the material 5b, the wave crests 4a and the wave troughs 4b of the electric field form planes perpendicular to the Z axis, so that a propagation that is close to a plane wave is attained.

In contrast, in the higher-order band propagation light, "nodes 4c" at which the electric field amplitude becomes zero occur near the boundary of the material 5a and the material 5b, for example, as shown in FIG. 1B. Therefore, one period of the layered structure formed by the adjacent material 5a and material 5b is partitioned into two regions with a wave crest and a wave trough. Since the phases of the waves are shifted by half a wavelength at the adjacent regions (material 5a and material 5b), the wave crests and wave troughs appear alternately. It is in the second and the third band that these two nodes 4c per period occur. Although not shown in the figure, for the guided light in the higher-order bands, the number of nodes per period increases even more, and shifts by half a wavelength occur several times per period.

Consequently, for the incident light 2 of a wavelength at which the first band and the higher-order bands contribute, both overlap in propagation light and form a complex electric field pattern.

Figure 2:
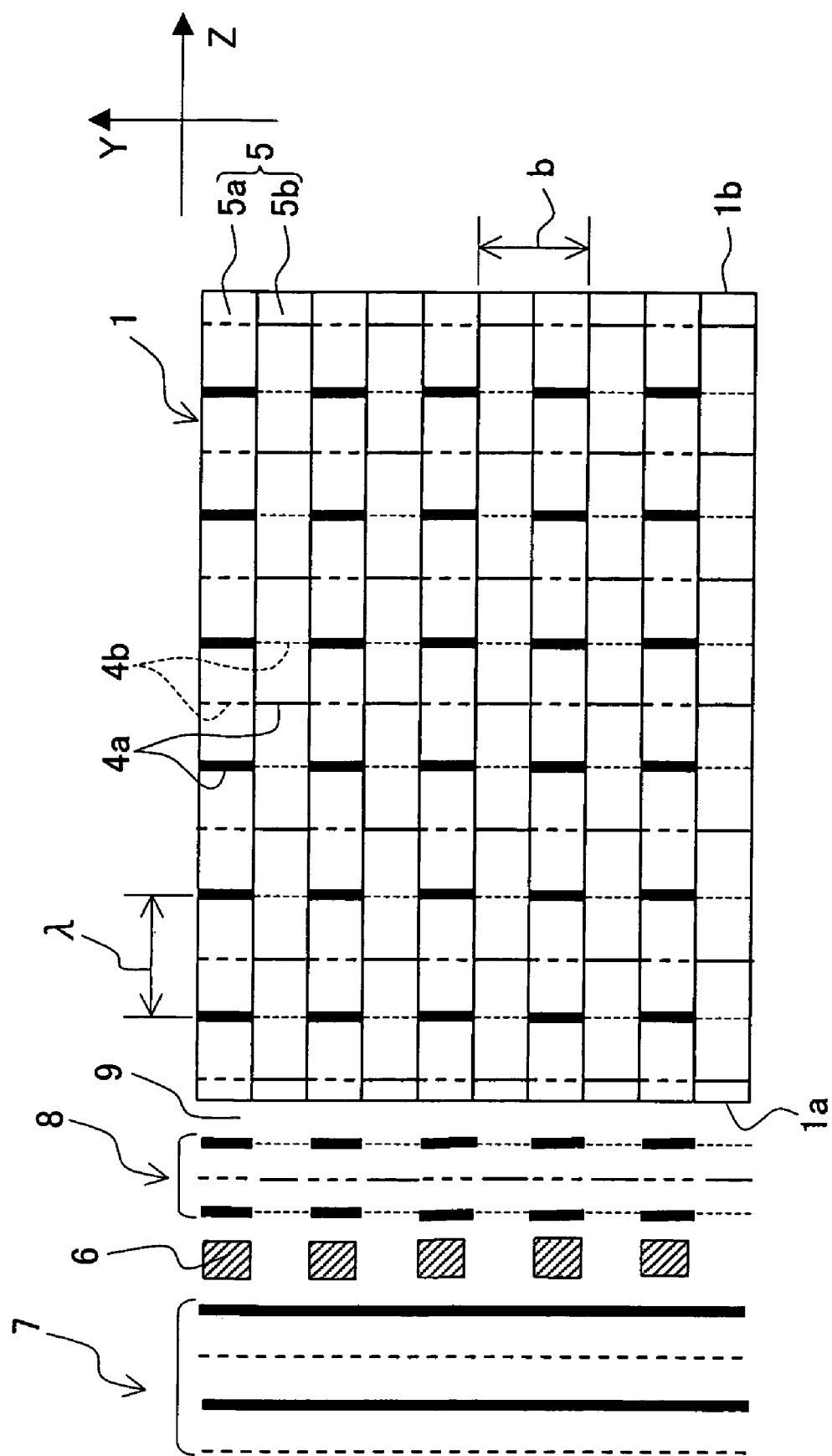
FIG. 2 is a sectional view schematically showing an intensity of an electric field of higher-order band propagation light in a waveguide element in which a phase grating is disposed on an incident side of the one-dimensional photonic crystal.

Further, FIG. 2 is a sectional view schematically showing the intensity of the electric field of the higher-order band propagation light in a waveguide element in which a phase grating is disposed on an incident side of the one-dimensional photonic crystal 1. A phase grating 6 is a phase modulation means for causing a difference of half a wavelength in the period b in the Y-axis direction. As shown in FIG. 2, when a plane wave 7 (solid lines indicate wave crests of the electric field, dashed lines indicate wave troughs of the electric field, and the amplitude is expressed by the thickness of those lines) is made to enter the phase grating 6, then an electric field pattern 8 that is similar to the higher-order band propagation light shown in FIG. 1B (solid lines indicate wave crests of the electric field, dashed lines indicate wave troughs of the electric field, and the amplitude is expressed by the thickness of those lines) can be formed in a space 9. An end face 1a of the one-dimensional photonic crystal (periodic multilayer film) 1 is placed in this space 9. The inventors found by simulation that, in this case, there is no light propagated in the first band, and only higher-order band propagation light is propagated as shown in FIG. 2.

Further, when imaging an optical path reversely, it also is possible to provide a suitable phase modulation means behind an exit side end face 1b of the one-dimensional photonic crystal, thus restoring the higher-order band propagation light that has left the end face 1b into a plane wave.

Further, studies conducted by the inventors have revealed that "when an appropriate phase modulation wave having a period 2b, which is twice the period b of the one-dimensional photonic crystal (periodic multilayer film) in the same direction, is made to enter this photonic crystal, only propagation light in the bands on the boundary of the Brilloum zones is attained." Moreover, including the lowest-order first band, the bands on the boundary of the Brilloum zones have a characteristic similar to the above-described "higher-order band propagation light."

Then, in the present embodiment, the technique combining the propagation in the bands on the boundary of the Brillouin zones and the phase modulation using the "one-dimensional photonic crystal having no periodicity in the propagation direction" described above is expanded to two-dimensional photonic crystal or photonic crystals with higher dimensions.

The following is a more specific description of the embodiment of the present invention.

Figure 3:
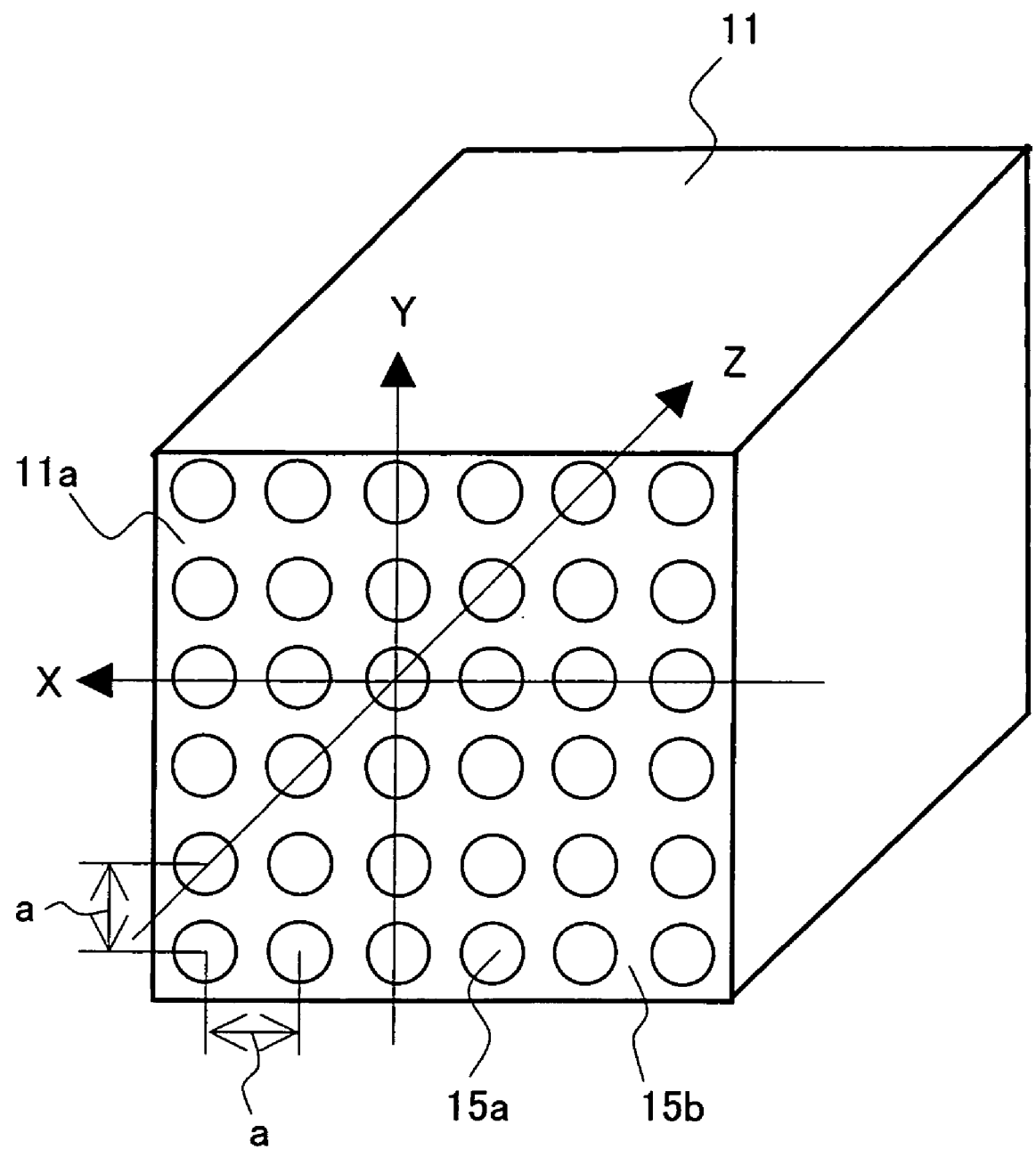
FIG. 3 is a perspective view showing a structure of a two-dimensional photonic crystal having a periodicity in the X-axis direction and the Y-axis direction and having no periodicity in the Z-axis direction.

FIG. 3 is a perspective view showing the structure of a two-dimensional photonic crystal 11 having a periodicity in the X-axis direction and the Y-axis direction and having no periodicity in the Z-axis direction. The two-dimensional photonic crystal 11 includes a plurality of cylindrical materials 15a arranged along the Z axis and a material 15b with a refractive index $n_B$ arranged between the materials 15a. The materials 15a have a radius R and a refractive index $n_A$. In the XY plane, the materials 15a are arranged in a square pattern with a period a. The photonic crystal 11 has a refractive index that is uniform in the Z-axis direction and has a refractive index structure that is periodic in the X-axis direction and the Y-axis direction.

In FIG. 3, when a plane wave with a vacuum wavelength of $\lambda_0$ is allowed to enter from an end face 11a of the photonic crystal 11, how this light propagates within the photonic crystal 11 can be determined by calculating and plotting the photonic bands. It should be noted that the end face 11a is perpendicular to the Z axis. Methods of band calculation are described in detail in "Photonic Crystals", Princeton University Press (1995) and in Physical Review vol. B 44, No. 16, p. 8565, 1991, for example.

Figure 4:
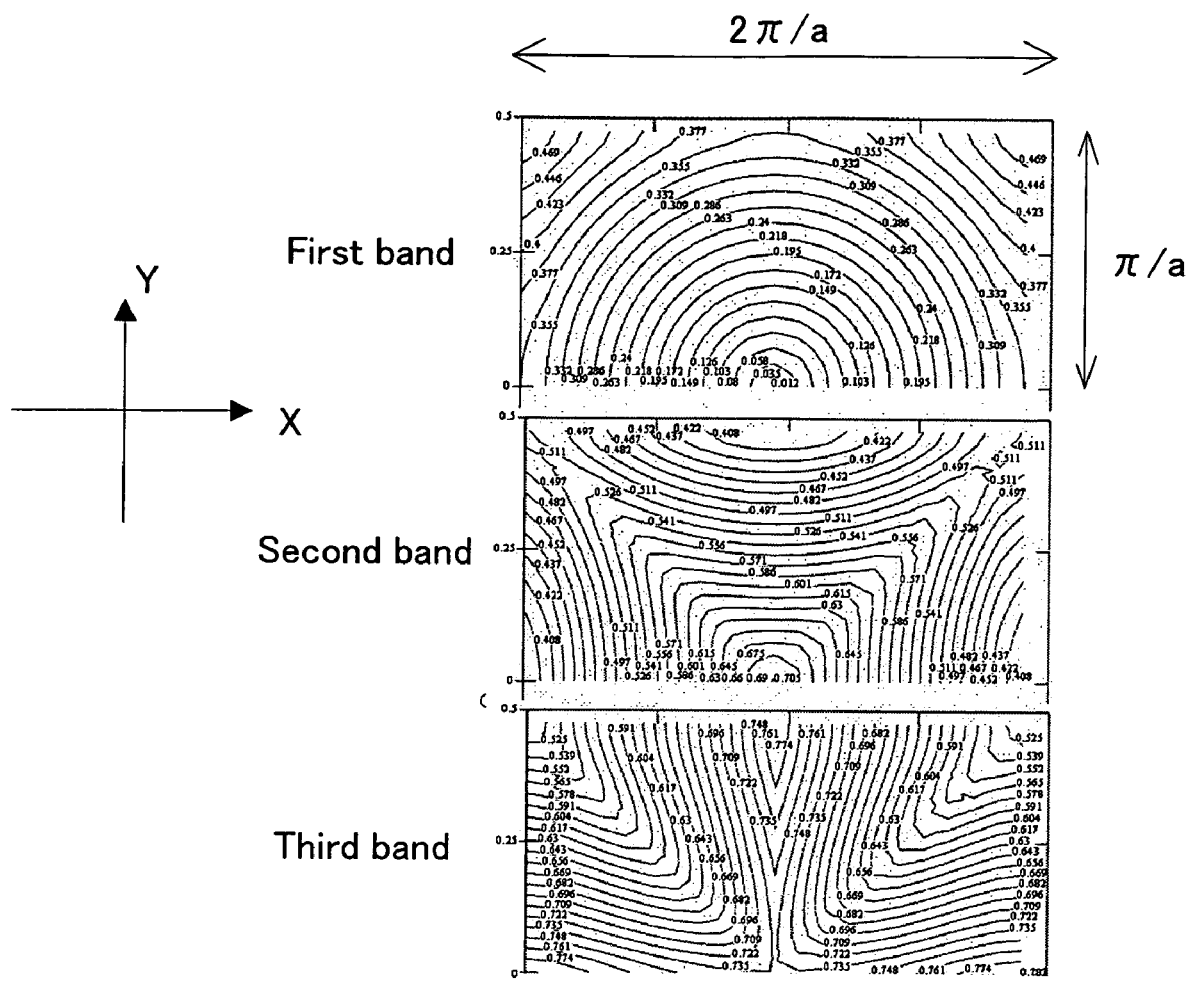
FIG. 4 is a band diagram for the photonic crystal in FIG. 3.

For the band calculation, it is assumed that the photonic crystal 11 shown in FIG. 3 has a periodic structure continuing infinitely in the X direction and the Y direction and extends infinitely in the Z direction. FIG. 4 is a band diagram for the photonic crystal 11 in FIG. 3. The conditions in FIG. 4 are shown below. It is noted that the radius R is expressed by the period a of the photonic crystal 11. In the case of refractive index $n_A$=1.00,
radius R=0.30a (0.30 times the period a) and
refractive index $n_B$=1.45, the results of the band calculation (by a plane wave method) in the XY plane are shown within half the range of a first Brilloum zone (upper half along the Y direction) with respect to first, second and third bands of TE polarized light. The upper half and the lower half along the Y direction are symmetrical.

The band diagram is shown as contour lines by connecting the points with equal normalized frequencies ωa/2πc, and subscripts in the diagram denote the values of ωa/2πc. Here, ω is the angular frequency of the incident light, a is the period of the structure, and c is the speed of light in a vacuum.

The normalized frequency also can be expressed as $a/\lambda_0$ using the vacuum wavelength $\lambda_0$ of the incident light and thus is expressed as $a/\lambda_0$ in the following. The width of the Brilloum zone in the X-axis direction and the Y-axis direction is 2π/a. The TE polarized light refers to polarized light whose electric field direction is the X-axis direction. In the case of FIG. 3, it is clear from the symmetry that the band diagram of TM polarized light (whose magnetic field direction is the X-axis direction) would have the same shape as this band diagram.

Figure 5:
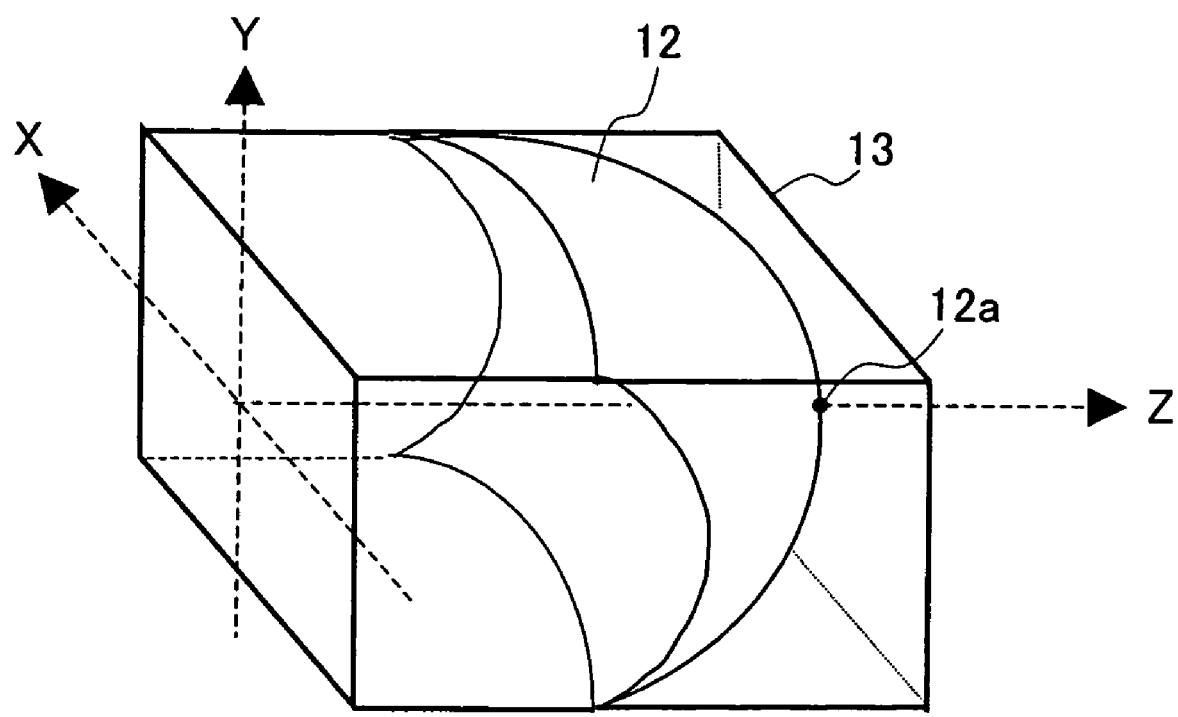
FIG. 5 is a band diagram schematically showing the shape of band surfaces with equal normalized frequencies in the Brillouin zone of the photonic crystal in FIG. 3.

Furthermore, the photonic band structure also spreads in the Z-axis direction. FIG. 5 is a band diagram schematically showing the shape of band surfaces 12 with equal normalized frequencies $a/\lambda_0$ in the Brilloum zone 13 of the photonic crystal 11 in FIG. 3. Since there is no periodicity in the Z-axis direction, the structure spreads infinitely without any Brilloum zone boundary.

Now, in the case of allowing the plane wave to enter the perpendicular end face 11a of the photonic crystal 11 shown in FIG. 3, the propagation light within the photonic crystal will be discussed.

Figure 6:
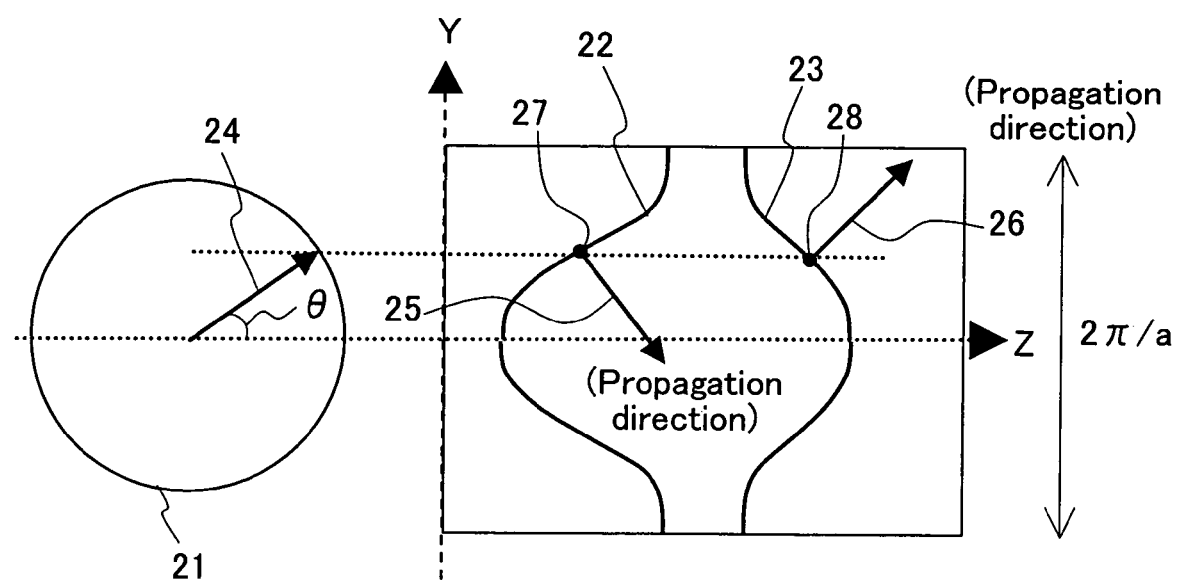
FIG. 6 is a schematic band diagram, taken on the YZ plane, including incident light to the photonic crystal shown in FIG. 3.

FIG. 6 is a schematic band diagram, taken on the YZ plane, including the incident light to the photonic crystal 11 shown in FIG. 3. More specifically, it is a schematic view illustrating on the band diagram the propagation in the case where the plane wave with a normalized frequency $a/\lambda_0$ is made to enter the end face 11a (parallel with the XY plane) of the photonic crystal 11 shown in FIG. 3 obliquely at an incident angle θ. For simplification, the inclination of the incident light is limited within the YZ plane. When the refractive index of a homogeneous material (for example, the air) that is in contact with the incident end face 11a is given as n, a band 21 of the homogeneous material can be expressed by a sphere (a circle in the YZ plane) with a radius=$n \cdot (a/\lambda_0)(2\pi/a)$.

By creating the drawing, it is possible to obtain a coupled band on the side of the photonic crystal 11. In FIG. 6, there are corresponding points 28 and 27 on a first band 23 and a second band 22, so that electromagnetic waves corresponding to the respective bands propagate through the photonic crystal 11. In FIG. 6, an arrow 24 indicates the direction of the incident light, an arrow 25 indicates the energy propagation direction of the propagation light in the second band, and an arrow 26 indicates the energy propagation direction of the propagation light in the first band. Further, in FIG. 5, the energy travel direction is a normal direction of the band surface 12.

Figure 7A:
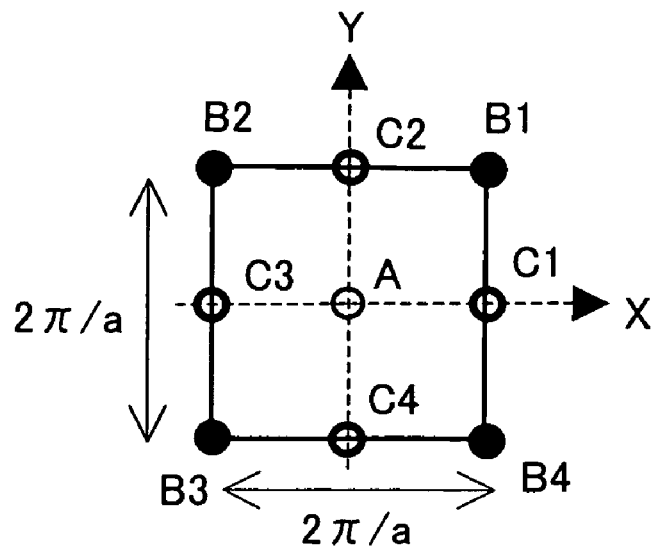
FIG. 7A is a plan view, taken on the XY plane, showing the Brillouin zone in the photonic crystal shown in FIG. 3.
Figure 7B:
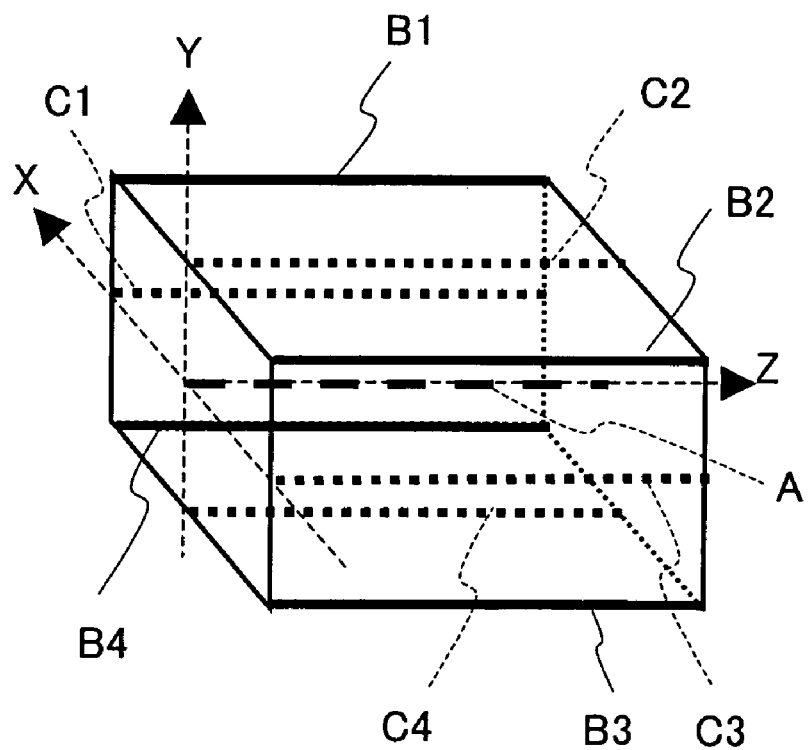
FIG. 7B is a perspective view showing the Brillouin zone in the photonic crystal shown in FIG. 3.

From FIG. 5, it can be seen that, in order to make the travel direction of the propagating electromagnetic wave energy parallel with the Z axis, it is necessary to use for propagation, for example, a point 12a on which the inclination of the band surface 12 becomes parallel with the XY plane. FIGS. 7A and 7B show the Brillouin zone in the photonic crystal 11 shown in FIG. 3. FIGS. 7A and 7B indicate the positions at which the inclination of the band surface 12 of the band diagram as shown in FIG. 5 is parallel with the XY plane. FIG. 7A is a plan view taken on the XY plane, and FIG. 7B is a perspective view. As shown in FIGS. 7A and 7B, the points on which the inclination of the band surface 12 of the band diagram as shown in FIG. 5 is parallel with the XY plane are located on each of lines A, B1, B2, B3, B4, C1, C2, C3 and C4 in the Brillouin zone owing to the symmetry. In the present embodiment, among these lines, propagation by B1, B2, B3, B4, C1, C2, C3 and C4 on the Brillouin zone boundaries will be utilized.

For example, a wave vector $k_1$ of the incident plane wave corresponding to a point on the line B1 is as follows.

$k_1 = (kx_1, ky_1, kz_1)$
$kx_1 = \pi/a$
$ky_1 = \pi/a$
$kz_1 = kz$ (positive real number)

The vacuum wavelength $\lambda_0$ of the plane wave can be calculated by the equation below.

$$\lambda_0 = 2\pi n/(kx_1^2 + ky_1^2 + kz_1^2)^{0.5}$$

Here, the value of $kz_1$ needs to be set to large to an extent that the band corresponding to $a/\lambda_0$ is present on the line B1.

In other words, by allowing the plane wave having a specific incident angle to enter the end face 11a of the photonic crystal 11 in the XY plane, the phase of the electromagnetic waves varies periodically in the XY plane, making it possible to achieve the propagation in the band on the Brillouin zone boundary. Similar effects can be obtained by inclining the incident end face 11a with respect to the XY plane, namely, by the configuration in which the incident end face 11a is not perpendicular to the propagation direction (Z-axis direction).

Now, the following description will be directed to how to achieve the propagation in the band on the Brillouin zone boundary by utilizing an interference between a plurality of plane waves.

When only a plane wave corresponding to the wave vector $k_1$ is allowed to enter, there are some cases in which propagations in a plurality of bands on the line B1 occur simultaneously or a reflection loss at the end face increases. Accordingly, in order to achieve the propagation in a single band efficiently, it is appropriate to combine three plane waves corresponding to the lines B2, B3 and B4 as shown in FIGS. 7A and 7B (the wave vectors $k_2$, $k_3$ and $k_4$) with the plane wave corresponding to the wave vector $k_1$ and allow them to enter. The wave vectors $k_2$, $k_3$ and $k_4$ are shown below.

$k_2 = (kx_2, ky_2, kz_2)$
$kx_2 = -\pi/a$
$ky_2 = \pi/a$
$kz_2 = kz$
$k_3 = (kx_3, ky_3, kz_3)$
$kx_3 = -\pi/a$
$ky_3 = -\pi/a$
$kz_3 = kz$
$k_4 = (kx_4, ky_4, kz_4)$
$kx_4 = \pi/a$
$ky_4 = -\pi/a$
$kz_4 = kz$

However, if the wavelength of each plane wave is changed while its travel direction is kept the same, the above-mentioned equations will not be satisfied completely, and the energy propagation direction will be shifted from the Z axis. In other words, the wavelength range in which a characteristic as an optical element can be maintained may become limited in some cases.

The set of lines C1, C2, C3 and C4 in FIGS. 7A and 7B can be utilized similarly to the lines B1, B2, B3 and B4. Also, the line A (which matches the Z axis) corresponds to the plane wave entering perpendicularly. However, as described above, there is a problem that the first band on the line A does not have sufficient characteristics of wavelength dispersion and group velocity anomaly.

Next, the following description will be directed to how to achieve the propagation in the band on the Brillouin zone boundary by utilizing a phase grating.

Figure 8A:
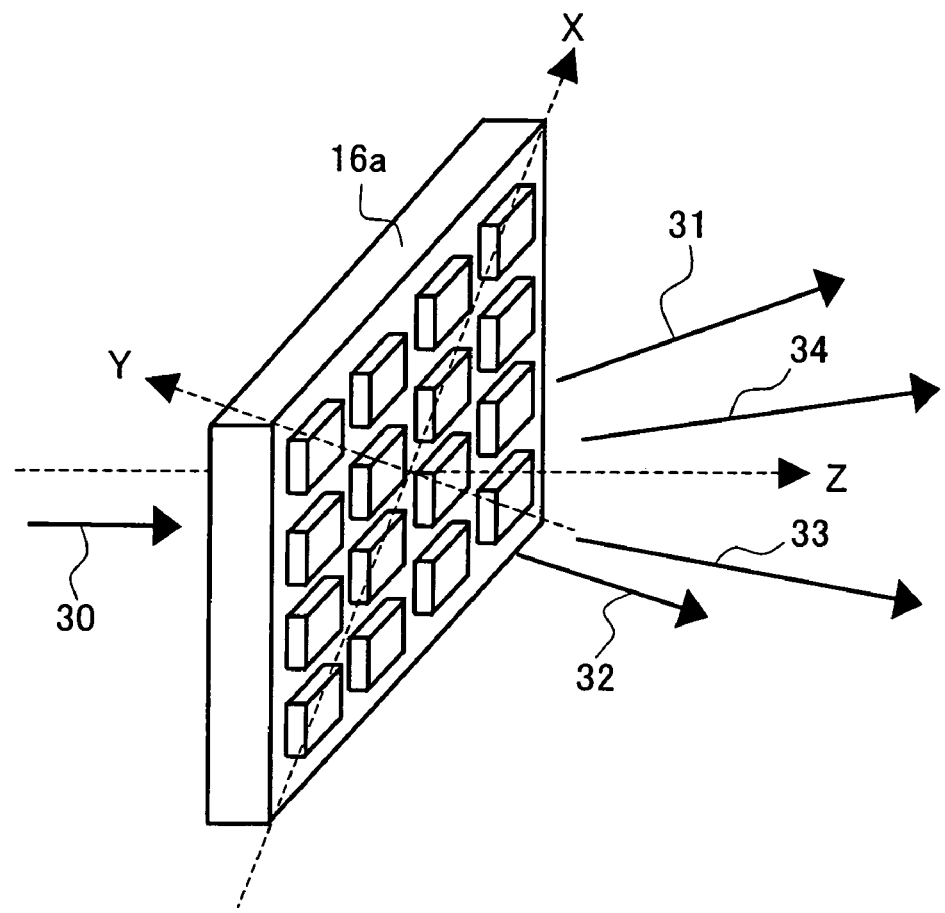
FIG. 8A is a perspective view showing a phase grating generating diffraction waves in four directions according to the present embodiment.

FIG. 8A is a perspective view showing a phase grating 16a generating diffraction waves in four directions according to the present embodiment. The phase grating 16a has a refractive index periodicity in plural directions (directions rotated by 45° from the X axis and the Y axis, respectively). When a plane wave 30 is allowed to enter such a phase grating 16a perpendicularly (enter along the Z-axis direction), it is possible to generate by the interference of the diffraction light a diffraction wave 31 corresponding to the wave vector $k_1$, a diffraction wave 32 corresponding to the wave vector $k_2$, a diffraction wave 33 corresponding to the wave vector $k_3$ and a diffraction wave 34 corresponding to the wave vector $k_4$ as described above in the interference of the plural plane waves. Therefore, by providing the end face 11a of the photonic crystal 11 shown in FIG. 3 immediately after this phase grating 16a, it is possible to obtain the propagation light in the Z-axis direction on the lines B1, B2, B3 and B4. Incidentally, if undesired diffraction light from the phase grating 16a is mixed in, it is not coupled effectively into a specific band of the photonic crystal 11, and therefore the phase grating 16a is desired to have a shape optimized so that desired diffraction light is intensified as much as possible.

Figure 8B:
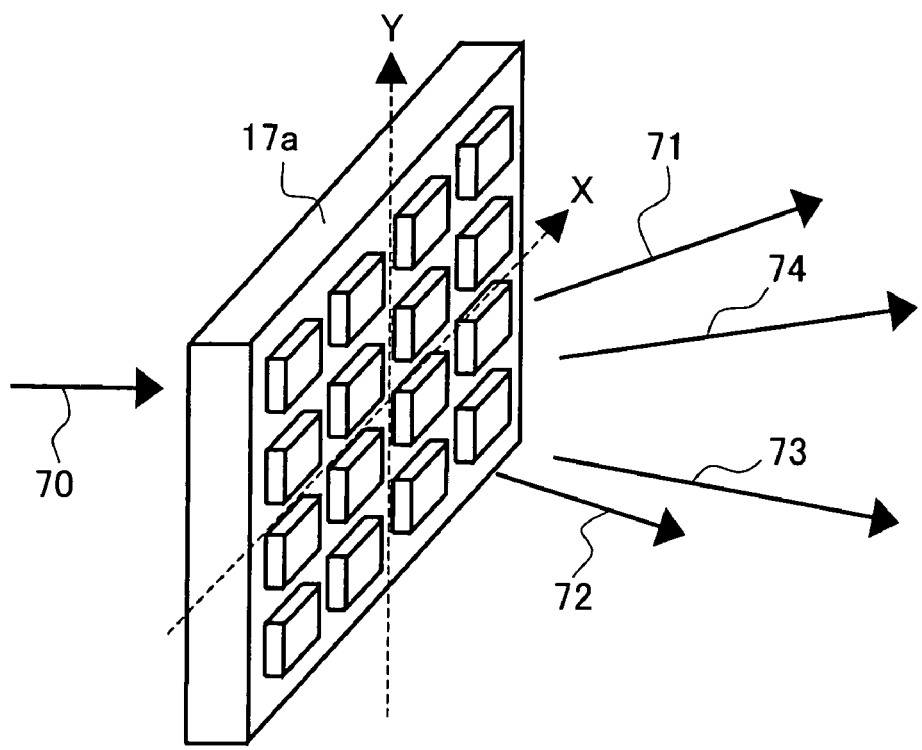
FIG. 8B is a perspective view showing another phase grating generating diffraction waves in four directions according to the present embodiment.

Further, in the phase grating 16a optimized at a specific wavelength, even if the wavelength of the incident plane wave varies slightly, the efficiency of the first diffraction light does not drop sharply but remains at a high level, so that a wide wavelength range can be used. It is needless to say that, by optimizing the shape and period of the phase grating 16a, the wavefront corresponding to the set of lines C1, C2, C3 and C4 shown in FIGS. 7A and 7B can be achieved. More specifically, a phase grating 17a as shown in FIG. 8B is appropriate. FIG. 8B is a perspective view showing another phase grating 17a generating diffraction waves in four directions according to the present embodiment. The phase grating 17a has a refractive index periodicity in the X-axis direction and the Y-axis direction. When a plane wave 70 is allowed to enter such a phase grating 17a perpendicularly (enter along the Z-axis direction), it is possible to generate by the interference of the diffraction light a diffraction wave 71 corresponding to the wave vector $k_1'$, a diffraction wave 72 corresponding to the wave vector $k_2'$, a diffraction wave 73 corresponding to the wave vector $k_3'$ and a diffraction wave 74 corresponding to the wave vector $k_4'$. Therefore, by providing the end face 11a of the photonic crystal 11 shown in FIG. 3 immediately after this phase grating 17a, it is possible to obtain the propagation light in the Z-axis direction on the lines C1, C2, C3 and C4. The wave vectors $k_1'$, $k_2'$, $k_3'$ and $k_4'$ are shown below.

$k_1' = (kx_1', ky_1', kz_1')$
$kx_1' = \pi/a$
$ky_1' = 0$
$kz_1' = kz'$ (positive real number)
$k_2' = (kx_2', ky_2', kz_2')$
$kx_2' = 0$
$ky_2' = \pi/a$
$kz_2' = kz'$
$k_3' = (kx_3', ky_3', kz_3')$
$kx_3' = -\pi/a$
$ky_3' = 0$
$kz_3' = kz'$
$k_4' = (kx_4', ky_4', kz_4')$ $kx_4' = 0$
$ky_4' = -\pi/a$
$kz_4' = kz'$ Besides the methods described above, the phase modulation also can be carried out by one or a combination of methods of "allowing a plane wave to enter obliquely the phase grating 16a or the phase grating 17a" and of "not providing the phase grating 16a or the phase grating 17a but processing the incident end face 11a of the photonic crystal 11 itself so as to have the same function as the phase grating 16a or the phase grating 17a."

In the above-described methods, when the propagation in the bands on the Brilloum zone boundary is generated within the photonic crystal 11, the outgoing light from the exit end face of the photonic crystal 11 is diffracted considerably. Accordingly, subjecting the outgoing light from the photonic crystal 11 to the phase modulation achieves plane wave outgoing light. As the method of the phase modulation, it is appropriate to dispose the above-noted phase grating 16a or the phase grating 17a shown in FIG. 8A or 8B as it is so that the positional relationship between its input end and output end is reversed, for example. When the same phase grating is disposed symmetrically on both of the incident side and the exit side of the photonic crystal 11, the same effect is achieved for propagation light in both directions, so that optical fibers can be coupled as they are to both ends, for example.

Figure 9A:
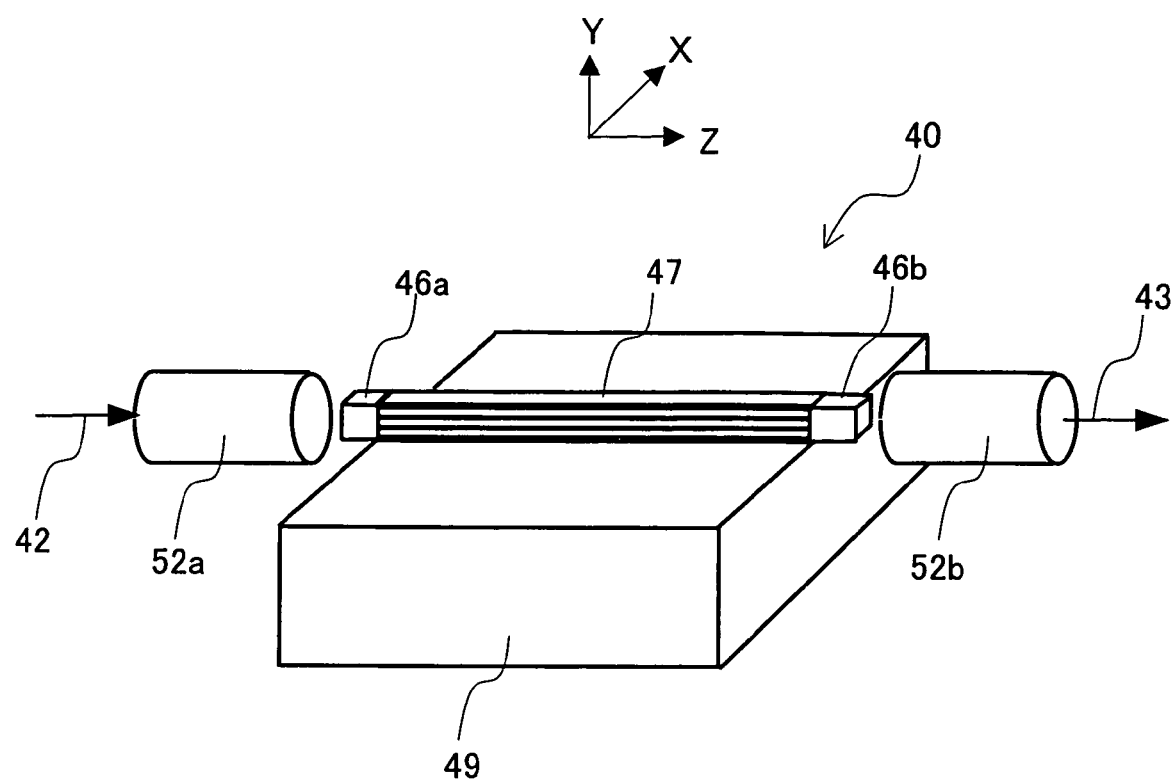
FIG. 9A is a perspective view showing the configuration of a waveguide element using a photonic crystal according to the present embodiment.
Figure 13:
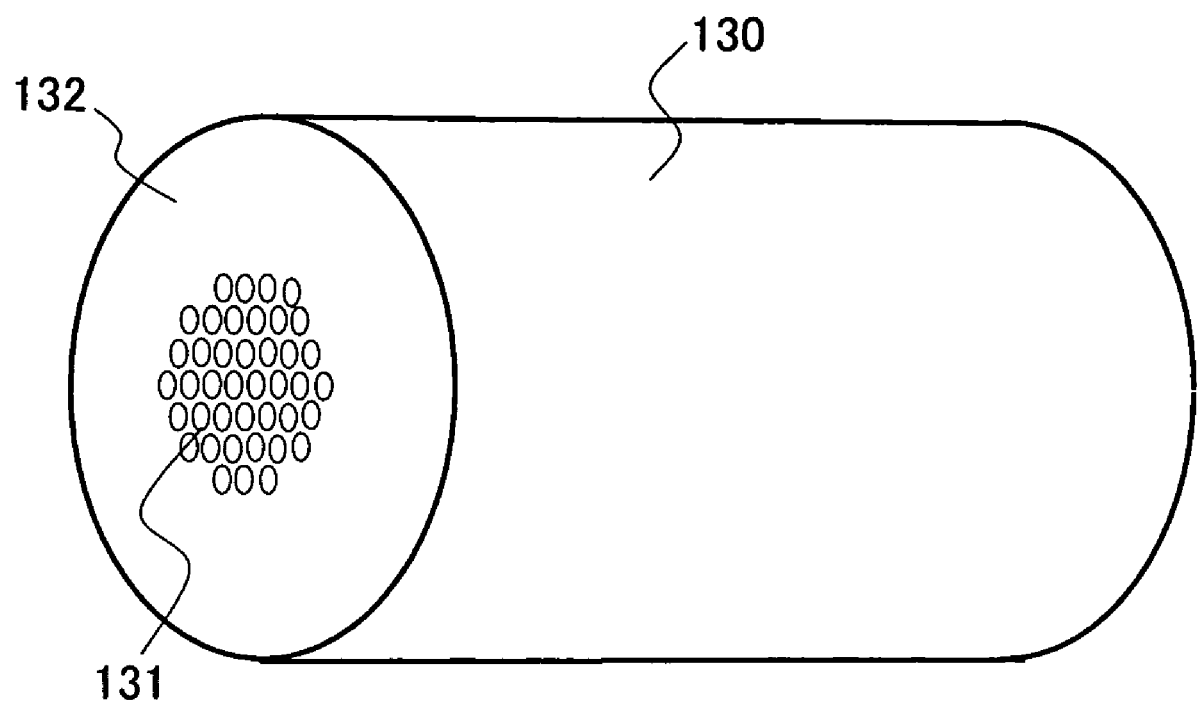
FIG. 13 is a perspective view showing the configuration of a basic two-dimensional photonic crystal optical fiber.

By the methods described above, the higher-order band propagation light can be formed efficiently within the photonic crystal 11. In the following, the configuration of a waveguide element using the photonic crystal according to the present embodiment, which is an optical element formed by the above-described methods, will be described. It should be noted that the case of forming a fiber-shaped waveguide portion also will be described later (FIG. 13). FIG. 9A is a perspective view showing the configuration of a waveguide element 40 using the photonic crystal according to the present embodiment. Also, FIG. 9B is a sectional view, taken on the XY plane, showing a waveguide portion 47 of the waveguide element 40.

Figure 9B:
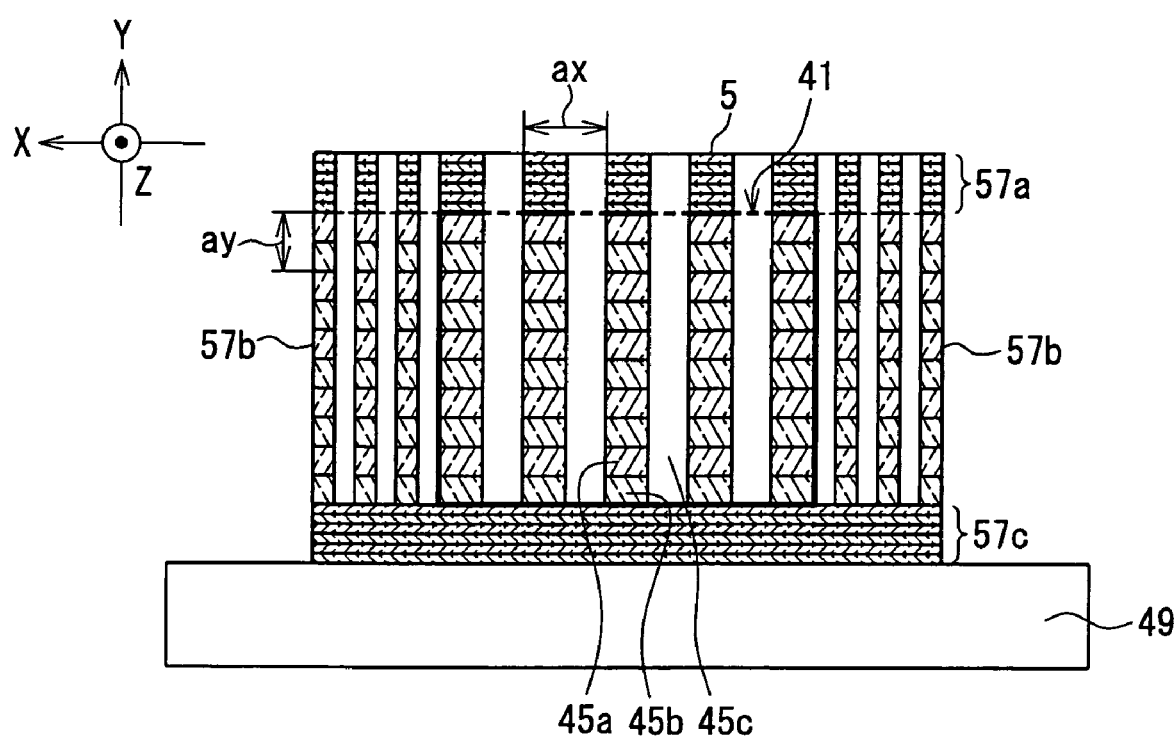
FIG. 9B is a sectional view, taken on the XY plane, showing a waveguide portion of the waveguide element shown in FIG. 9A.

In FIGS. 9A and 9B, the waveguide portion 47 including a two-dimensional photonic crystal 41 is formed on an appropriate substrate 49. The photonic crystal 41 has a uniform refractive index in the Z direction, which is a light propagation direction, and a refractive index that is periodic in the X-axis direction and the Y-axis direction, which are perpendicular to the light propagation direction. More specifically, as shown in FIG. 9B, a photonic crystal 57a and a photonic crystal 57c are provided on upper and lower surfaces (end faces parallel with the XZ plane) of the photonic crystal 41. Further, photonic crystals 57b are formed on right and left surfaces (end faces parallel with the YZ plane) of the photonic crystal 41. These photonic crystals 57a, 57b and 57c are claddings in the waveguide portion 47, have a refractive index periodicity or a material that is different from the photonic crystal 41 serving as a core and function such that light is confined in the photonic crystal 41.

In the Y-axis direction, the photonic crystal 41 through which light propagates has parts in which a material 45a and a material 45b are layered alternately in a periodic manner and parts in which a material 45c is provided. Also, in the X-axis direction, the photonic crystal 41 has layers in which the material 45c and the material 45a are layered alternately in a periodic manner and layers in which the material 45c and the material 45b are layered alternately in a periodic manner. Further, the material 45a, the material 45b and the material 45c extend in the Z-axis direction. Incidentally, the material 45c is the air in the present embodiment. As described above, the photonic crystal 41 has a refractive index periodicity in the direction other than the light propagation direction. As shown in FIG. 9B, the period in the Y-axis direction of the photonic crystal 41 is ay, whereas the period in the X-axis direction thereof is ax.

Both ends of this photonic crystal 41 are provided with phase grating 46a and 46b serving as a phase modulation portion. Moreover, an incident portion such as a rod lens 52a for allowing incident light 42 to enter the phase grating 46a is provided. This rod lens 52a focuses the incident light 42 on the end face of the phase grating 46a. In this manner, the light can be made to enter the phase grating 46a perpendicularly. Also, the exit end side of the phase grating 46b is provided with a rod lens 52b serving as an exit means. As described above, the phase grating 46a is designed to have a structure, for example, capable of generating the diffraction wave corresponding to the wave vector $k_1$, the diffraction wave corresponding to the wave vector $k_2$, the diffraction wave corresponding to the wave vector $k_3$ and the diffraction wave corresponding to the wave vector $k_4$. This achieves the propagation in the band on the Brillouin zone boundary in the photonic crystal 41. It should be noted that the phase grating 46a and the phase grating 46b that are disposed near the end faces of the photonic crystal 41 respectively may be in contact with the photonic crystal 41. Additionally, the photonic crystal 41 may be formed as one piece with the phase grating 46a and the phase grating 46b. This allows easier production.

In such a waveguide element 40, the incident light 42 from an optical fiber, for example, is focused by the rod lens 52a serving as the incident portion and allowed to enter the phase grating 46a disposed at a beam waist position. The incident light 42 whose phase has been modulated by the phase grating 46a enters the photonic crystal 41 serving as a core of the waveguide portion 47 and turns into specific higher-order band propagation light. In other words, the propagation on the Brilloum zone boundary is achieved in the photonic crystal 41 so as to bring about "very large wavelength dispersion" and "group velocity anomaly."

The propagation light is converted into a plane wave again by the phase grating 46b disposed at the exit end face of the photonic crystal 41, and allowed to enter the rod lens 52b by which it turns into the outgoing light 43. The outgoing light 43 is coupled to the optical fiber or the like.

As described earlier, the higher-order band propagation light has a group velocity that varies considerably according to the wavelength of the incident light. Consequently, the waveguide element 40 can be used as optical control elements such as an optical retardation element and a dispersion compensation element in optical communications.

Also, since the propagation light with a slow group velocity increases a non-linear optical effect as described above, it is possible to provide an element with still larger non-linear optical effect by doping the photonic crystal 41 with microscopic particles of a substance having a non-linear optical effect. It is noted that the waveguide element 40 has the above-mentioned effect as long as it is coupled to a band near the Brillouin zone boundary.

Further, in order to increase a non-linear optical effect, there are methods of placing a thin-film layer including a substance exhibiting a non-linear optical effect at every single period of the photonic crystal 41, of using a substance having a non-linear effect for forming the photonic crystal 41, and the like.

The following is a description of a procedure of manufacturing the waveguide portion 47 including the photonic crystal 41 shown in FIG. 9B. First, the material 45*a* and the material 45*b* are formed alternately in the Y-axis direction on the substrate 49, thus forming a periodic multilayer film. Next, a stripe-patterned mask is put on the XZ plane of the multilayer film formed of the material 45*a* and the material 45*b* so that grooves whose depth direction corresponds to the Y-axis direction are formed by etching. By forming these grooves, the material 45*c*, which is the air, is provided.

When manufacturing the waveguide portion 47, the configuration of the waveguide portion 47 can be varied by changing the material for the multilayer film layered in the Y-axis direction, the pattern of the film thickness and the patterns of the groove width and period, etc.

Figure 10A:
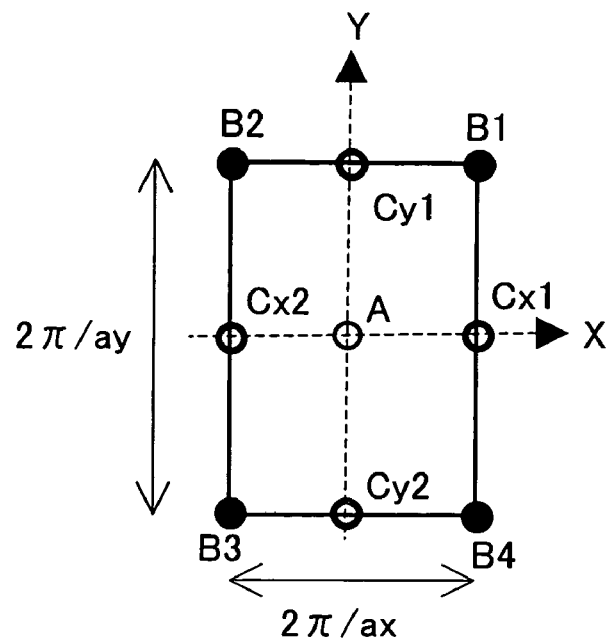
FIG. 10A is a plan view, taken on the XY plane, showing the Brillouin zone in the photonic crystal shown in FIG. 9B.
Figure 10B:
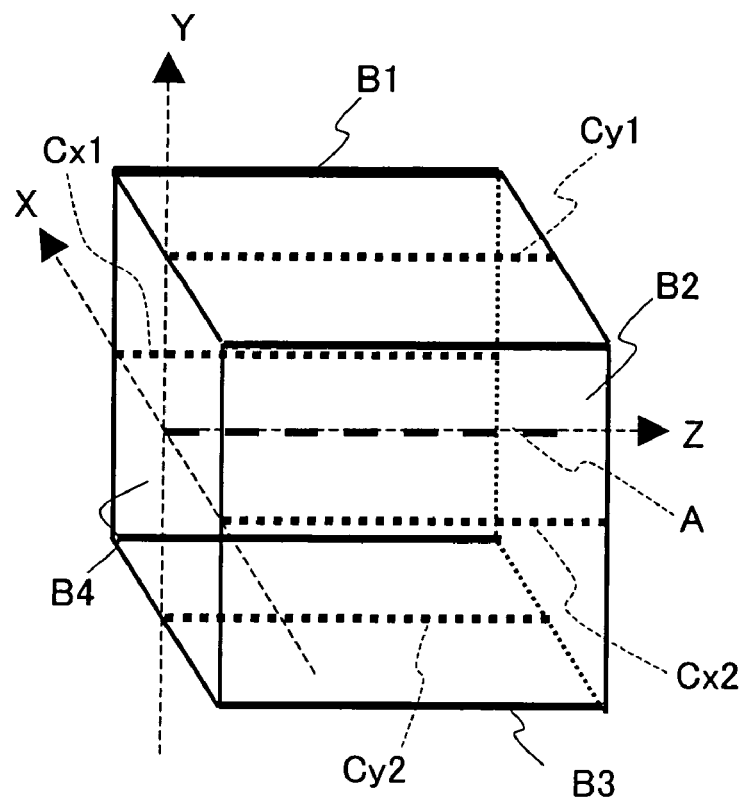
FIG. 10B is a perspective view showing the Brillouin zone in the photonic crystal shown in FIG. 9B.

For example, FIGS. 10A and 10B show the Brillouin zone in the photonic crystal 41 shown in FIG. 9B. FIG. 10A is a plan view taken on the XY plane, and FIG. 10B is a perspective view. As shown in these figures, the Brillouin zone has a rectangular shape in the XY plane. In this case, the combination of the incident plane waves is that of plane waves corresponding to the lines B1, B2, B3 and B4. The wave vectors $k_1$, $k_2$, $k_3$ and $k_4$ of these plane waves are shown below.

$k_1 = (kx_1, ky_1, kz_1)$
$kx_1 = \pi/ax$
$ky_1 = \pi/ay$
$kz_1 = kz$
$k_2 = (kx_2, ky_2, kz_2)$
$kx_2 = -\pi/ax$
$ky_2 = \pi/ay$
$kz_2 = kz$
$k_3 = (kx_3, ky_3, kz_3)$
$kx_3 = -\pi/ax$
$ky_3 = -\pi/ay$
$kz_3 = kz$
$k_4 = (kx_4, ky_4, kz_4)$
$kx_4 = \pi/ax$
$ky_4 = -\pi/ay$
$kz_4 = kz$

When a vacuum wavelength is given as $\lambda_0$, kz can be calculated by the equation below.

$$\lambda_0 = 2\pi n/(kx_1^2 + ky_1^2 + kz_1^2)^{0.5}$$

Also, the wave vectors $k_1$ and $k_2$ in the case of plane waves corresponding to the lines Cx1 and Cx2 shown in FIGS. 10A and 10B are as follows.

$k_1 = (kx_1, ky_1, kz_1)$
$kx_1 = \pi/ax$
$ky_1 = 0$
$kz_1 = kz$
$k_2 = (kx_2, ky_2, kz_2)$
$kx_2 = -\pi/ax$
$ky_2 = 0$
$kz_2 = kz$

Similarly, the wave vectors $k_1$ and $k_2$ in the case of plane waves corresponding to the lines Cy1 and Cy2 are as follows.

$k_1 = (kx_1, ky_1, kz_1)$
$kx_1 = 0$
$ky_1 = \pi/ay$
$kz_1 = kz$
$k_2 = (kx_2, ky_2, kz_2)$
$kx_2 = 0$
$ky_2 = -\pi/ay$
$kz_2 = kz$

The calculation method of the value of kz is the same as that described above.

In order to commercialize the waveguide element 40 of the present embodiment, it is essential to confine light in the X-axis direction and the Y-axis direction of the photonic crystal 41.

Now, the period of the higher-order band propagation light (angular frequency ω) propagating in the photonic crystal 41 is given as λ. Since the period of an electromagnetic wave with an angular frequency ω in vacuum is $\lambda_0 = 2\pi c/\omega$, the value of $\lambda_0/\lambda$ is defined as an effective refractive index. Here, n indicates a refractive index of a medium in contact with a lateral surface of the photonic crystal 41. When the condition:

$$\lambda_0/\lambda > n$$

is satisfied, the propagation light forms a wavefront on the side of the medium that is in contact with the lateral surface of the photonic crystal 41 and cannot leak out. Consequently, the propagation light is confined in the photonic crystal 41.

However, depending on the peculiar shapes of the photonic bands, the effective refractive index sometimes is smaller than 1. In such cases, the light confinement cannot be performed even if the outside medium is vacuum. Then, it becomes necessary to prevent the propagation light from escaping. In that case, the refractive index period or structure of each of the photonic crystals 57*a*, 57*b* and 57*c* provided around the photonic crystal 41 in FIG. 9B are made different from those of the photonic crystal 41, thereby confining the propagation light. In other words, the photonic crystal 41 serving as the core is surrounded by the photonic crystals 57*a*, 57*b* and 57*c* having a different period, making it possible to confine the propagation light in the photonic crystal 41.

Figure 11:
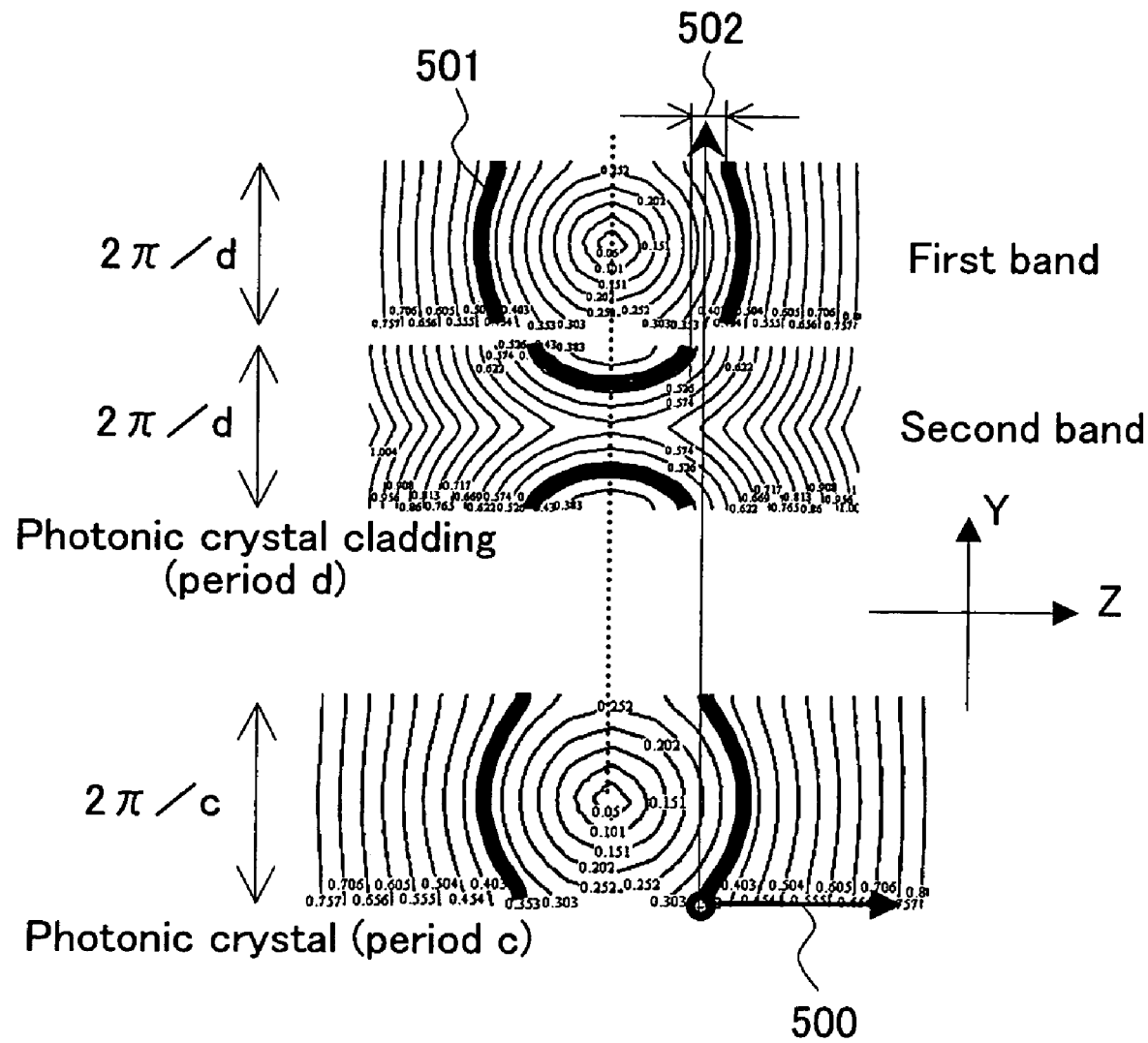
FIG. 11 is a schematic band diagram, taken on the YZ plane, showing adjacent photonic crystals with respect to a wavelength $\lambda_0$.

FIG. 11 is a schematic band diagram, taken on the YZ plane, showing adjacent photonic crystals with respect to a wavelength $\lambda_0$. The photonic crystal and a photonic crystal cladding shown in FIG. 11 have a period c and a period d, respectively (d>c). Inside the photonic crystal having a period c, propagation light in the Z direction on the Brillouin zone boundary is propagated (in the first band). In FIG. 11, an arrow 500 indicates an energy direction of the propagation light. Further, a band 501 for the wavelength $\lambda_0$ also is shown in the figure. In photonic crystal cladding (with a period d), a region in which no band is present in the Z direction (a band gap 502) is generated, so that there is no band corresponding to the propagation inside the photonic crystal (with a period c). Thus, the propagation light of the photonic crystal (with a period c) is not coupled to the photonic crystal cladding (with a period d). In other words, the confinement is achieved.

In this manner, using photonic crystals having different periods, the light leakage from the photonic crystals can be prevented.

As shown in FIG. 9B, the material and structure of the photonic crystals 57*a*, 57*b* and 57*c* for confinement may be different from those of the photonic crystal 41 for propagation, though it is desired to use the same material with different periods in view of the effort involved in fabricating the multilayer film. In FIG. 9B, for example, the two-dimensional photonic crystal 57*a* having a different period from the photonic crystal 41 is provided on the upper side of the two-dimensional photonic crystal 41. Also, the two-dimensional photonic crystals 57*b* having a different width from the photonic crystal 41 are provided on the right and left sides of the two-dimensional photonic crystal 41. Further, the one-dimensional photonic crystal 57*c* having a different period from the photonic crystal 41 is provided on the lower side of the two-dimensional photonic crystal 41.

Before designing, it of course is necessary to confirm by band calculation that, in a wavelength range and a propagation band used for the photonic crystal 41, bands corresponding to the wave vectors of the propagation light do not exist in the photonic crystals 57*a*, 57*b* and 57*c*.

When determining the light confinement with the band diagram shown in FIG. 11, it is assumed that a photonic crystal for confinement (with a period d) has an infinite periodic structure. Therefore, if the photonic crystal for confinement has only, for example, three periods, then the confinement may become insufficient, so that the propagation light may leak to the outside. Also, providing an unnecessarily large number of periods is not preferable with regard to cost as well as the durability and precision of the multilayer film. Accordingly, it is desired that the number of periods that is necessary at a minimum in practice should be determined experimentally or through electromagnetic simulation.

Furthermore, according to the simulation performed by the inventors of the present invention, since the higher-order band propagation light propagates such that the wave crests and wave troughs of the electric field alternate, it does not tend to form a wavefront from the surface and does not leak out easily. Thus, the waveguide element 40 shown in FIGS. 9A and 9B also may have a configuration in which the lateral surfaces of the photonic crystal 41 are in direct contact with a homogeneous material such as an air layer, without providing the photonic crystals 57*a*, 57*b* and 57*c*.

Figure 12:
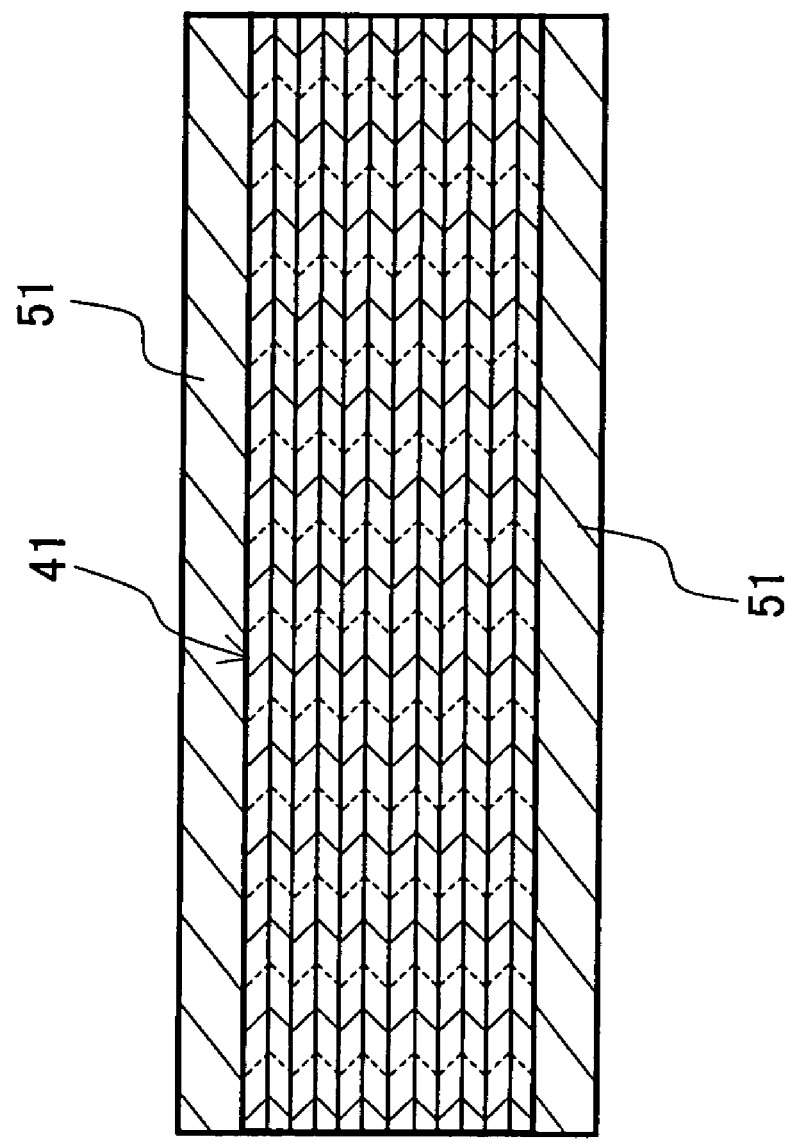
FIG. 12 is a sectional view showing the configuration of a photonic crystal provided with reflecting layers.
Figure 12:
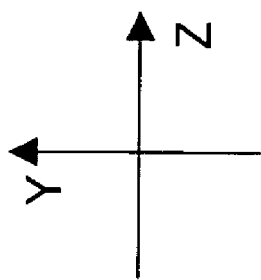

FIG. 12 is a sectional view showing a configuration of the photonic crystal 41 provided with reflecting layers 51. The photonic crystal 41 shown in FIG. 9B is surrounded by the photonic crystals 57*a*, 57*b* and 57*c*. Instead, the reflecting layers 51 such as metal films may be formed around the photonic crystal 41 as shown in FIG. 12. In this manner, the propagation light can propagate in the photonic crystal 41 without leaking to the outside.

However, in the case where the reflecting layers 51 are provided around the photonic crystal 41, there sometimes arise problems of lowering strength of the multilayer film, attenuation of the propagation light due to insufficient reflectance, etc.

Figure 9C:
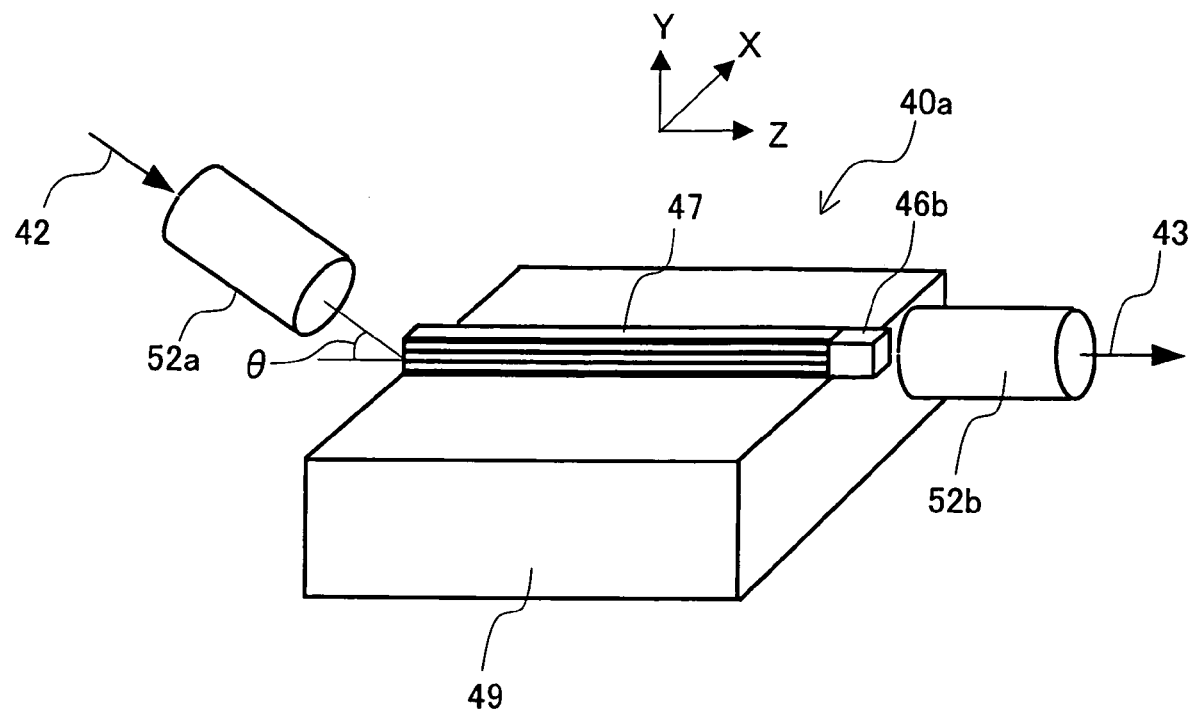
FIG. 9C is a perspective view showing the configuration of a waveguide element using another photonic crystal according to the present embodiment.

Although the above description has been directed to the waveguide element 40, light also may be allowed to enter the incident end face of the photonic crystal 41 obliquely without using the phase grating 46*a* specifically as described earlier as long as the propagation in the band is achieved on the Brillouin zone boundary in the photonic crystal 41. This allows the propagation in the band on the Brilloum zone boundary in the photonic crystal 41. FIG. 9C is a perspective view showing the configuration of a waveguide element 40*a* using another photonic crystal according to the present embodiment. Unlike the waveguide element 40 shown in FIG. 9A, the waveguide element 40*a* shown in FIG. 9C includes no phase grating 46*a*, and a rod lens 52*a* serving as the incident portion allows light to enter the incident end face not perpendicularly but at a certain angle (an incident angle θ). Incidentally, the incident end face is perpendicular to the Z axis. In this case, the rod lens 52*a* for allowing the inclined light to enter the incident end face serves as the phase modulation portion.

Figure 9D:
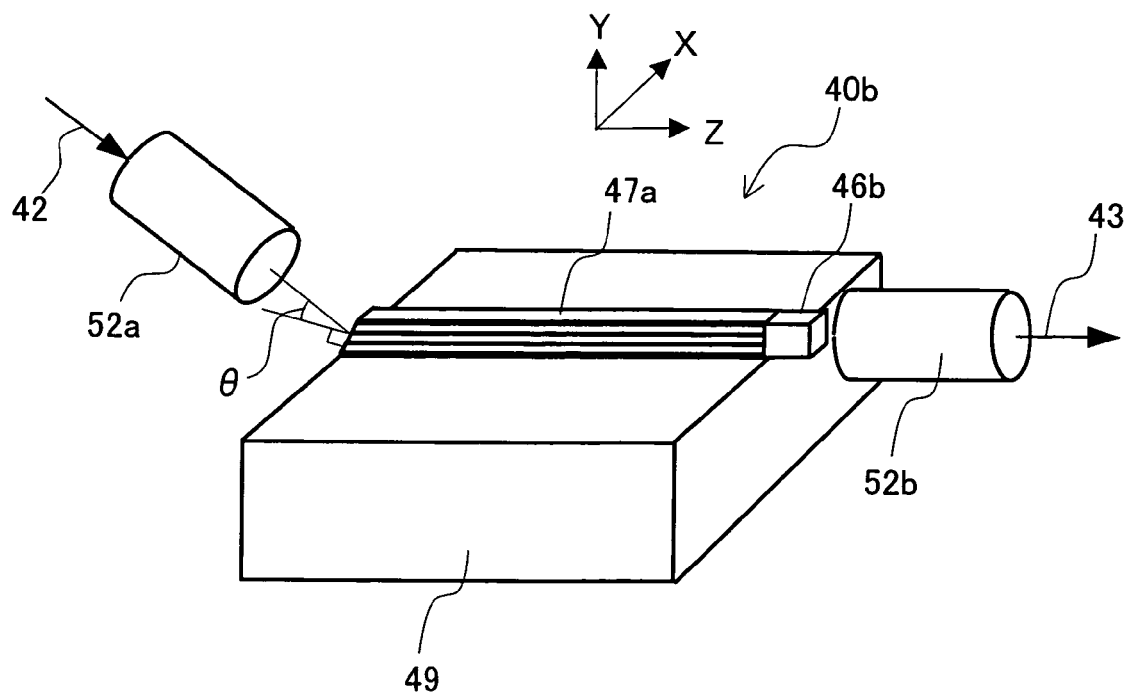
FIG. 9D is a perspective view showing the configuration of a waveguide element using another photonic crystal according to the present embodiment.

Further, the propagation in the band on the Brillouin zone boundary may be achieved in the photonic crystal 41 by inclining the incident end face of the photonic crystal with respect to the propagation direction so as to allow light to enter the incident end face obliquely. More specifically, a waveguide element 40*b* shown in FIG. 9D is appropriate. FIG. 9D is a perspective view showing the configuration of the waveguide element 40*b* using another photonic crystal according to the present embodiment. Unlike the waveguide portion 47 of the waveguide element 40*a* shown in FIG. 9C, a waveguide portion 47*a* of the waveguide element 40*b* shown in FIG. 9D has an incident end face that is not perpendicular to the propagation direction of the propagation light (the Z direction). Other than these respects, the waveguide element 40*b* shown in FIG. 9D is the same as the waveguide element shown in FIG. 9C. As described above, the incident end face of the wave guide portion 47*a* is inclined, and the incident end face of the photonic crystal serving as a core of the waveguide portion 47*a* also is not perpendicular to but inclined with respect to the propagation direction (the Z direction). Then, the rod lens 52*a* is disposed such that the light enters at an incident angle θ with respect to the incident end face.

In the above description of the waveguide element using the photonic crystal according to the present embodiment, the case where the two-dimensional photonic crystal in which the light propagates has a substantially rectangular cross-section has been taken as an example. However, the present embodiment is not limited to this and has a similar effect even in the case of a so-called photonic crystal fiber in which the two-dimensional photonic crystal has a substantially circular cross-section and the photonic crystal itself has a cylindrical shape (a fiber shape).

In the following, the case in which the photonic crystal has a fiber shape will be described.

FIG. 13 is a perspective view showing the configuration of a basic two-dimensional photonic crystal optical fiber. A cylindrical optical fiber 130 has a core 131 with a two-dimensional periodic structure around its center axis and a cladding 132 with no periodicity that surrounds the core 131.

Figure 14A:
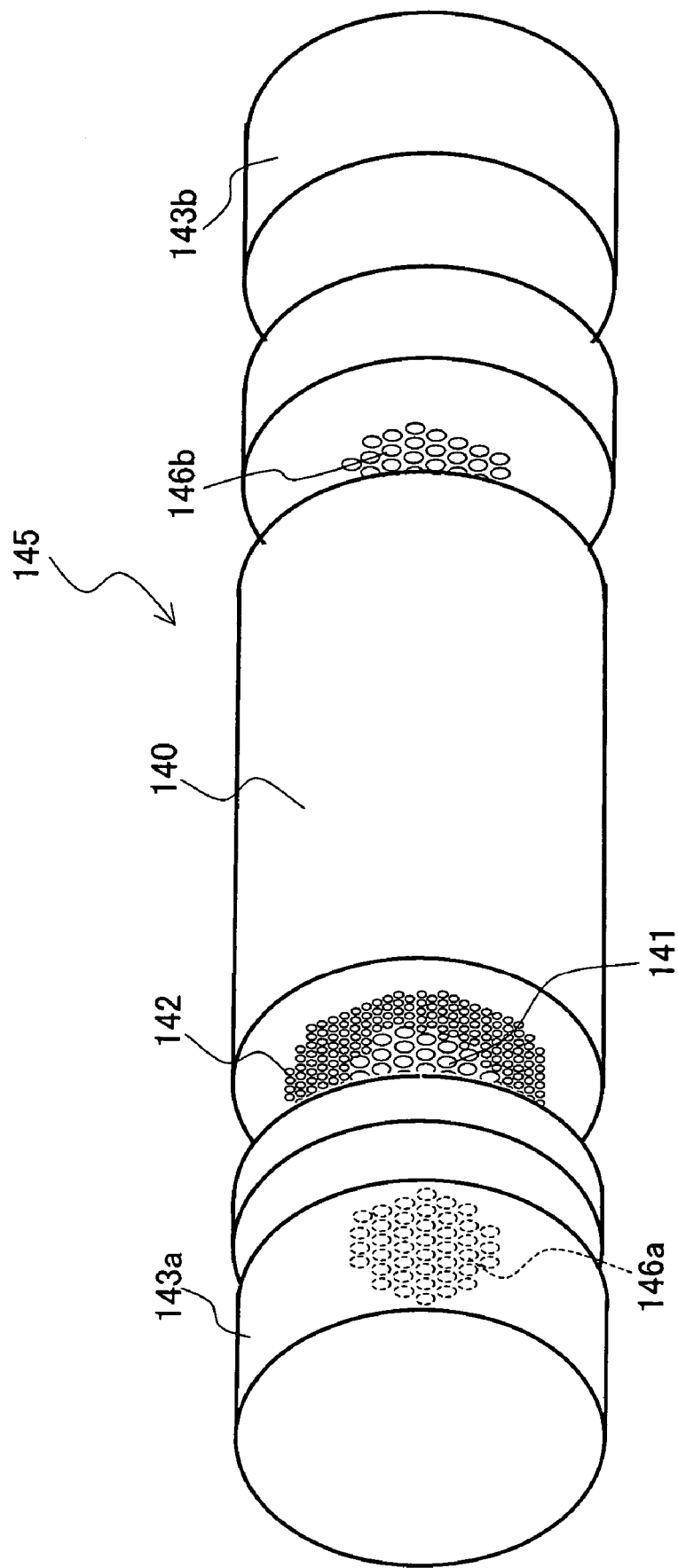
FIG. 14A is a perspective view showing the structure of a waveguide element using a fiber-shaped photonic crystal according to the present embodiment.

FIG. 14A is a perspective view showing the structure of a waveguide element 145 using a fiber-shaped photonic crystal according to the present embodiment. An optical fiber 140 has a core 141 with a two-dimensional periodic structure and a cladding 142 that surrounds the core 141. At both ends of the optical fiber 140, phase gratings 146*a* and 146*b* are disposed. When incident light, which is a plane wave, enters the phase grating 146*a* through a rod lens 143*a* serving as the incident portion, it is subjected to a phase modulation. The light subjected to the phase modulation enters the core 141, propagates through the core 141 as higher-order band light and exits from the core 141. The light that has exited from the core 141 is diffraction light but is restored again to a plane wave by the phase grating 146*b* and then enters a rod lens 143*b* serving as the exit portion. The phase gratings 146*a* and 146*b* at both ends have the same shape and can be used in either of the incident and outgoing directions. The phase grating 146*a* is configured to phase-modulate the plane wave so that the propagation in the band on the Brilloum zone boundary is achieved in the photonic crystal 41 as described above.

Because of its fiber shape, the waveguide element 145 has a wide range of uses.

Although the cladding 142 and the core 141 both are photonic crystals, they have different periods and structures so as to function to confine the propagation light in the core 141 by the photonic band gap.

Figure 14B:
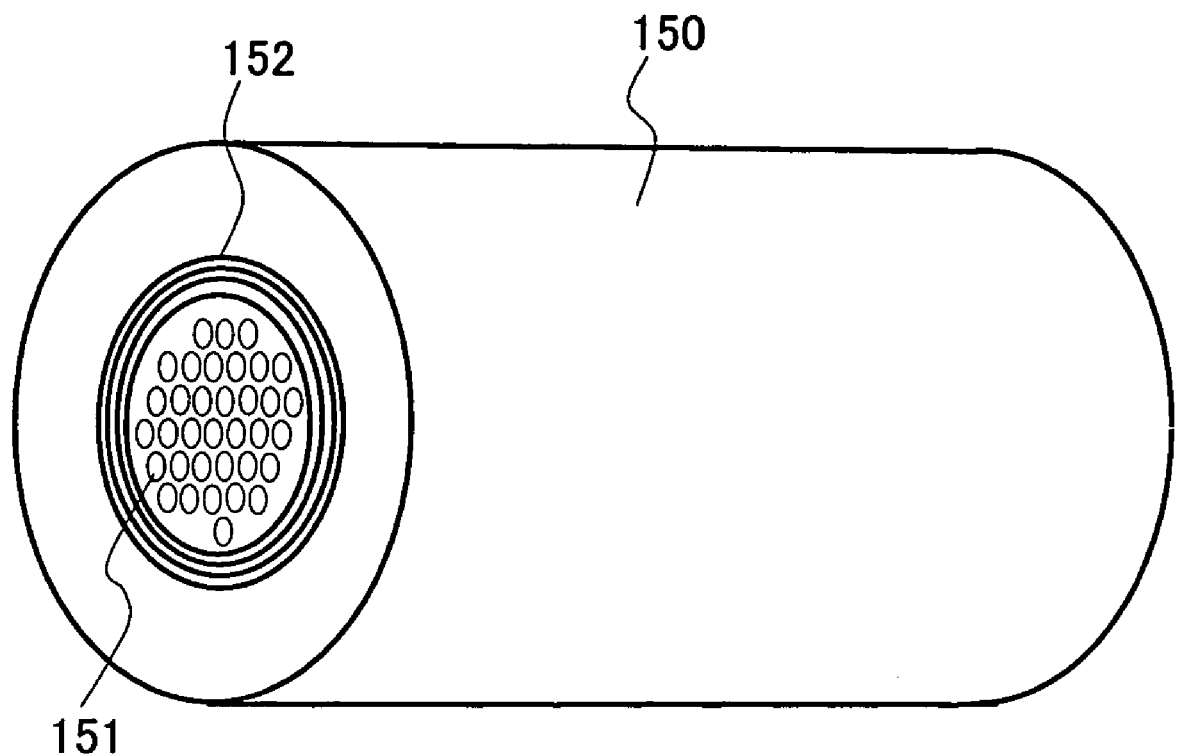
FIG. 14B is a perspective view showing the configuration of another optical fiber that can be used for the waveguide element in FIG. 14A.

Further, FIG. 14B is a perspective view showing the configuration of another optical fiber 150 that can be used for the waveguide element 145 in FIG. 14A. As shown in FIG. 14B, a core 151 of the optical fiber 150 has a configuration similar to that of the core 141 of the optical fiber 140 in FIG. 14A. However, as shown in FIG. 14B, a cladding 152 may have a concentric photonic crystal structure having a periodicity in a radial direction. Such a cladding structure can be produced by winding and then fixing two layers of thin films with different refractive indices, followed by spinning and drawing, as suggested in a document, Photonics West 2003 Technical summary digest, p. 383, lecture number C4993-04, for example. In this case, although the structure becomes helical instead of precisely concentric, it still is possible to achieve a sufficient confinement effect. It is appropriate that the phase gratings 146a and 146b shown in FIG. 14A be disposed at the incident and exit ends of the optical fiber 150 shown in FIG. 14B.

Similarly to the above, the plane wave is subjected to a phase modulation by the phase grating 146a and then coupled to the optical fiber 140 or the optical fiber 150, whereby a higher-order band propagates in the optical fiber 140 or the optical fiber 150. This brings about a group velocity anomaly much larger than that in the case of a conventional optical fiber using a single mode propagation in a lowest-order band. Consequently, large dispersion compensation effects and non-linear optical effects can be achieved.

Also, since the core 141 and the core 151 have a periodic structure and do not have any limitation on their size, it is possible to provide a core with a large diameter easily, thus allowing a simple connection between fibers.

The fiber-shaped photonic crystal can be obtained by forming a plurality of cavities along a longitudinal direction in a fiber-shaped homogeneous material, with the plurality of cavities being arranged to have symmetrical periodicities with respect to an axis parallel with the longitudinal direction. All or some of these cavities also can be filled with a fluid material, for example.

Figure 15A:
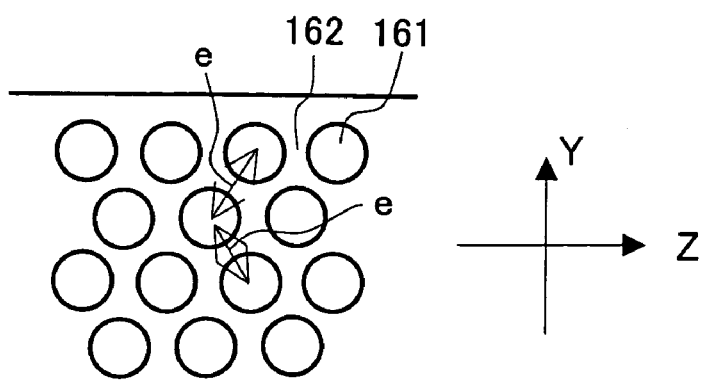
FIG. 15A illustrates an arrangement of cavities in the XY plane of the optical fiber shown in FIG. 14A.
Figure 15B:
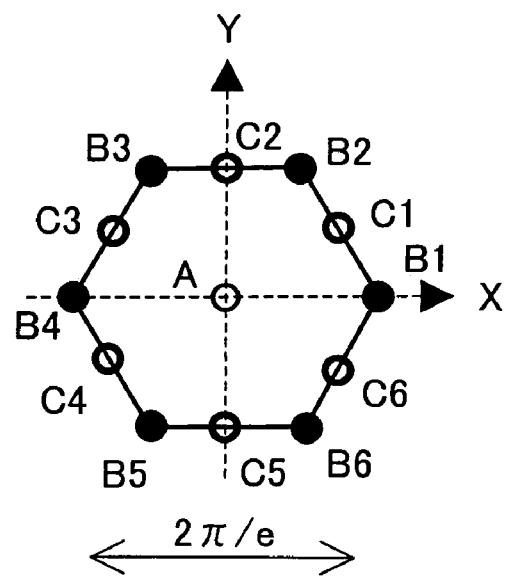
FIG. 15B is a plan view, taken on the XY plane, showing the Brillouin zone in the structure shown in FIG. 15A.
Figure 15C:
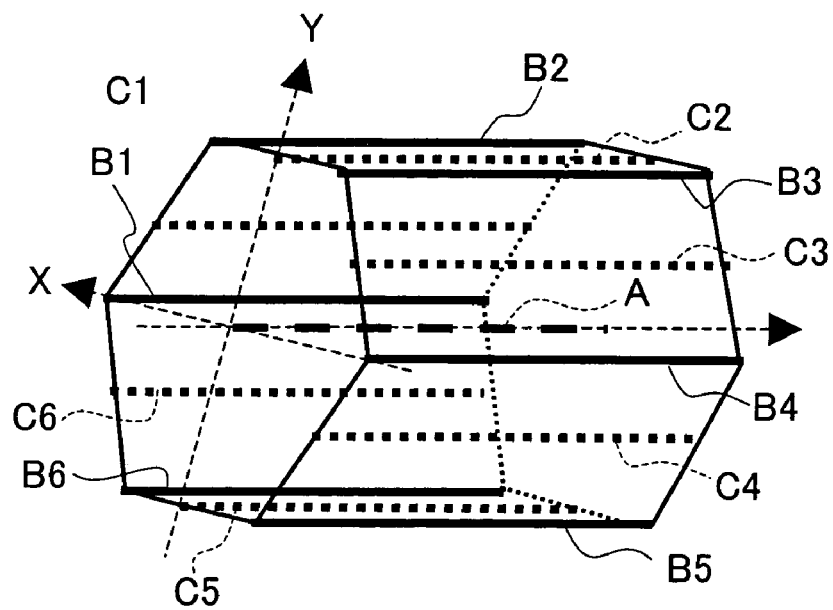
FIG. 15C is a perspective view showing the Brillouin zone in the structure shown in FIG. 15A.

As the arrangement of the plurality of cavities, an easy-to-form triangular arrangement now will be described. FIG. 15A illustrates the arrangement of cavities in the core 141 in the XY plane of the optical fiber 140 shown in FIG. 14A. As shown in FIG. 15A, cavities 161 are formed in a homogeneous material 162. In this case, a period e is the distance between the cavities 161. Furthermore, FIGS. 15B and 15C show the Brilloum zone in the structure shown in FIG. 15A. FIG. 15B is a plan view taken on the XY plane, and FIG. 15C is a perspective view. As becomes clear from FIG. 15B, the Brillouin zone in the XY plane is hexagonal. In this case, the combination of the incident plane waves may be a superposition of plane waves corresponding to lines B1, B2, B3, B4, B5 and B6 or that of plane waves corresponding to lines C1 to C6, for example.

Moreover, a so-called "photonic crystal group velocity anomaly" occurs in the light propagated in the higher-order propagation bands, so that an increased non-linear optical effect can be expected. In the present embodiment, no energy is taken up by the first band light in which there is substantially no group velocity anomaly. Therefore, it is possible to attain an increased effect of optical non-linearities by, for example, including non-linear optical material in the core of the multilayer film or the photonic crystal optical fiber (see Optical Fiber Communication 2002/Conference and Exhibit Technical Digest, ThK4, p. 468, for example).

In the above-described waveguide element using the photonic crystal according to the present embodiment, the material of the photonic crystal is not particularly limited as long as its transparency can be ensured in the wavelength range used. Suitable materials are silica, silicon, titanium oxide, tantalum oxide, niobium oxide, magnesium fluoride and silicon nitride, which are ordinarily used as the material for multilayer films and which have excellent durability and film-manufacturing costs. With these materials, a multilayer film can be formed easily by well-known methods such as sputtering, vacuum deposition, ion assisted deposition or plasma CVD. Also, the waveguide element 40 shown in FIG. 9A may have a so-called airbridge structure, which uses no substrate 49.

As the ratio of the refractive indices between the materials constituting the photonic crystal becomes larger, also the wavelength dispersion tends to increase. Consequently, it is desired that high refractive index and low refractive index materials be combined for applications in which such characteristics are necessary. As for refractive index ratios that can be used in practice, when the air (with a refractive index of 1) is used as the low refractive index material and InSb (with a refractive index n of 4.21) is used as the high refractive index material, then a refractive index ratio equal to or greater than 4 can be attained (see "BISHOKOGAKU HANDBOOK" (Microoptics Handbook), Asakura Shoten, 1995, p. 224).

The photonic crystal fiber can be produced by a generally known method of spinning quartz glass pipes that are bundled together. In this case, the refractive index periodic structure is formed by the combination of the quartz and the air holes, which brings about a sufficient effect.

When the refractive index ratio of the materials constituting the photonic crystal becomes small, then the difference in the characteristics depending on the polarization direction tends to become small. Thus, it is useful to lower the refractive index ratio to realize non-dependency on polarization.

By selecting suitable materials, the waveguide element using the photonic crystal according to the present embodiment can achieve its effect in an optical element in a typically used wavelength range of about 200 nm to 20 μm. However, since the principle of the photonic crystal is applicable to general electromagnetic waves, it also can be applied to electric waves with longer wavelengths and X-rays and gamma rays with shorter wavelengths. In other words, the waveguide element using the photonic crystal according to the present embodiment can be applied not only for light but also for electromagnetic waves in general.

In the photonic crystal propagating electromagnetic waves in the waveguide element using the photonic crystal according to the present embodiment, the refractive index periodicity in the propagation direction of the electromagnetic waves is not a necessary condition. However, by providing a Bragg diffraction grating having a slight difference in refractive index in the propagation direction, it also is possible to reflect only an electromagnetic wave at a specific wavelength, for example.

CALCULATION EXAMPLE

As a specific example, an electromagnetic wave simulation (a finite element method) was conducted under the following conditions with respect to the case where a plane wave was allowed to enter the end face 11a of the two-dimensional photonic crystal 11 shown in FIG. 3. In the following calculation example, all the lengths were normalized with reference to the period a, which was a refractive index period.

(1) Structure of Photonic Crystal

In the material 15b, the materials 15a, which were cylindrical cavities, were arranged in a square pattern.

(Material 15b) Refractive index $n_B$=1.45
(Material 15a) Refractive index $n_A$=1.00, and a cylindrical shape with a radius R of 0.3a.

The coordinates of the center of the cylindrical shape were (x, y)=(pa, qa), where p and q are integers. The photonic band diagram (TE polarized light) was the same as that shown in FIG. 4.

(2) Incident Light
(Vacuum wavelength) $\lambda_0$=a (a/$\lambda_0$=1.00)

As the plane waves corresponding to points on the lines B1, B2, B3 and B4 shown in FIGS. 7A and 7B, the following wave vectors $k_1$, $k_2$, $k_3$ and $k_4$ were set as wave vectors.

$k_1$=($kx_1$, $ky_1$, $kz_1$)
$kx_1$=$\pi$/a
$ky_1$=$\pi$/a
$kz_1$=kz
$k_2$=($kx_2$, $ky_2$, $kz_2$)
$kx_2$=$-\pi$c/a
$ky_2$=$\pi$/a
$kz_2$=kz
$k_3$=($kx_3$, $ky_3$, $kz_3$)
$kx_3$=$\pi$/a
$ky_3$=$-\pi$/a
$kz_3$=kz
$k_4$=($kx_4$, $ky_4$, $kz_4$)
$kx_4$=$-\pi$/a
$ky_4$=$-\pi$/a
$kz_4$=kz

The value of kz was calculated from the relationship below.

$$\lambda_0 = 2\pi/(kx_1^2 + ky_1^2 + kz_1^2)^{0.5}$$

The refractive index n in the part in contact with the incident end face was set to 1.

The incident plane waves were of four kinds having matched amplitudes and phases expressed by $$A \cdot \exp(i\omega t)\exp(-ik_1 \cdot r)$$

$$A \cdot \exp(i\omega t)\exp(-ik_2 \cdot r)$$

$$A \cdot \exp(i\omega t)\exp(-ik_3 \cdot r)$$

$$A \cdot \exp(i\omega t)\exp(-ik_4 \cdot r)$$

where A denotes the amplitude, i denotes an imaginary unit, $\omega$ denotes an angular frequency and r=(x, y, z) denotes a vector indicating a position.

(3) Simulation

The result of the simulation of the propagation inside the photonic crystal by the finite element method is shown below. The software used here was JMAG manufactured by The Japan Research Institute, Limited.

Figure 16:
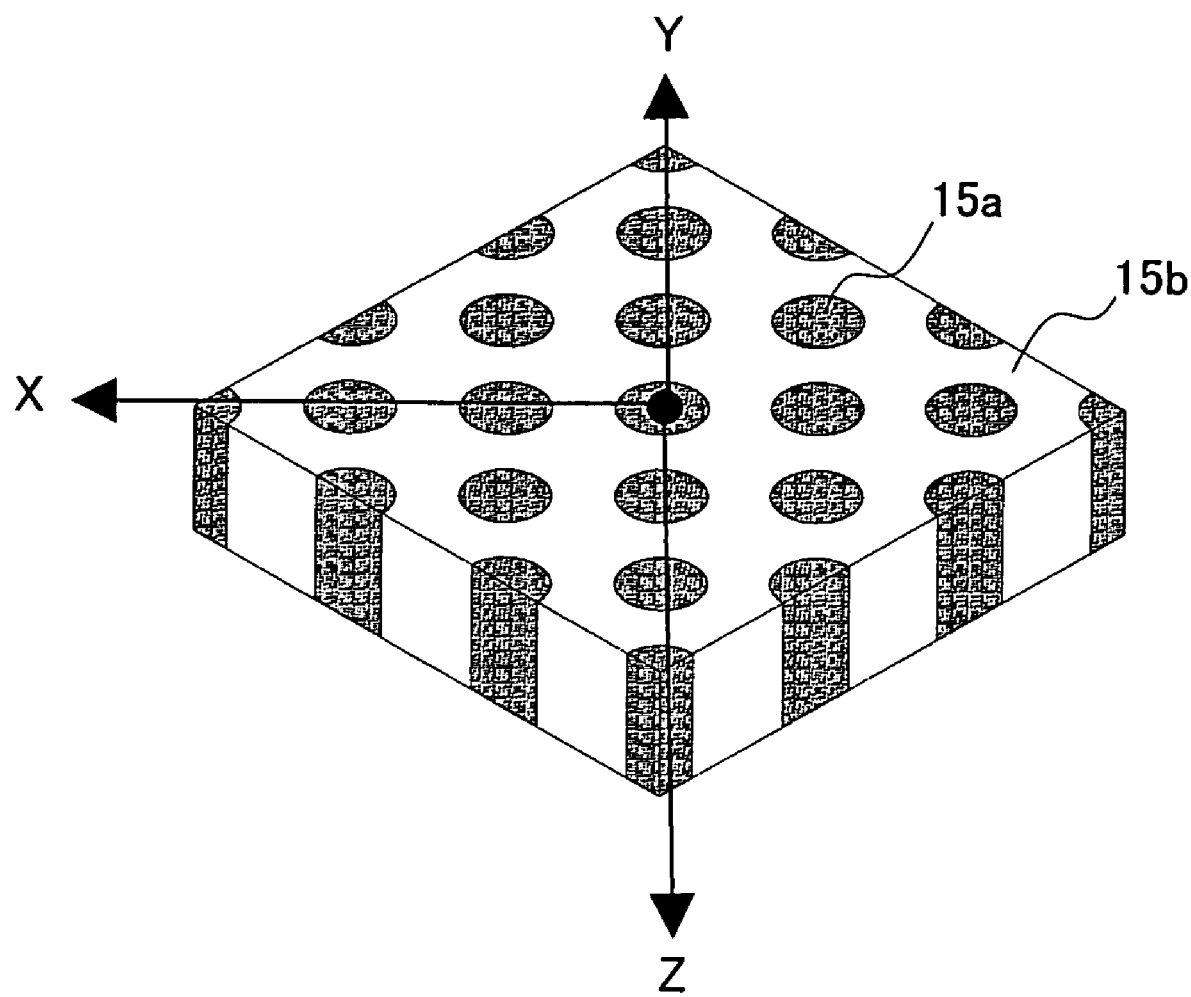
FIG. 16 shows a calculation model in a simulation.
Figure 17:
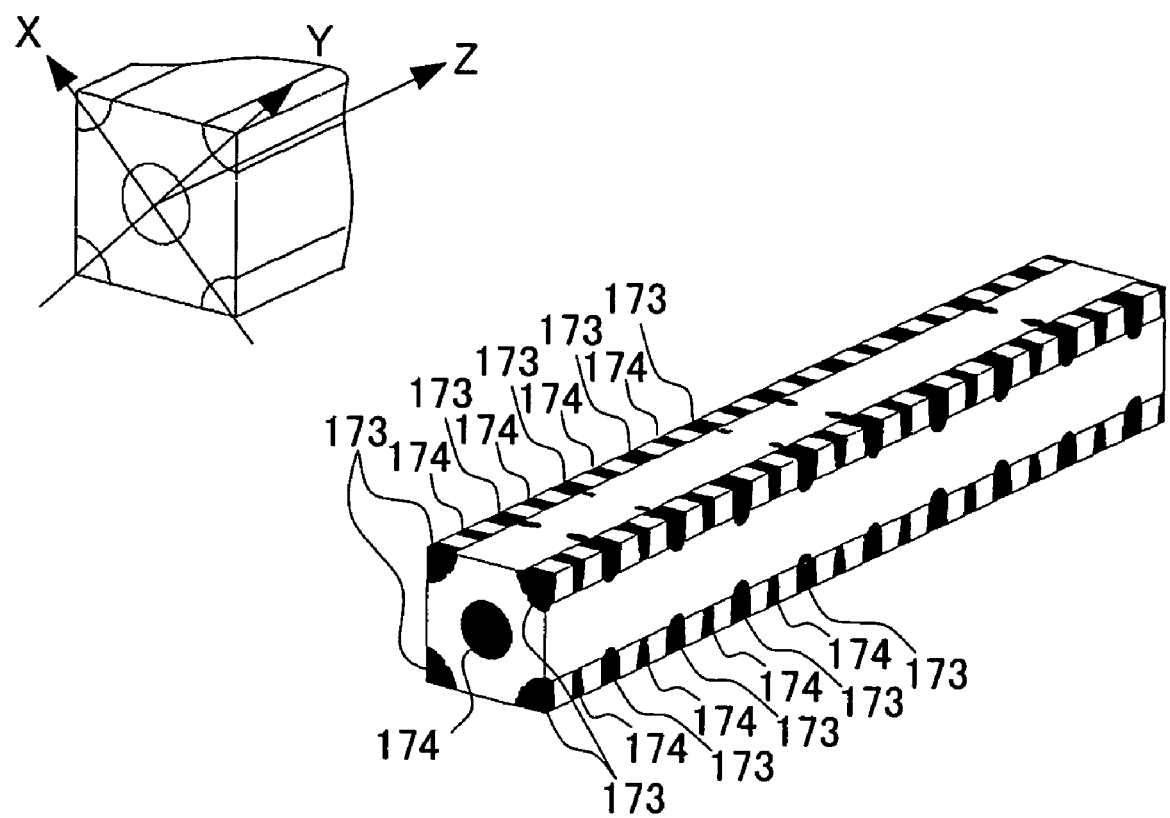
FIG. 17 shows an electric field intensity distribution in a simulation in a calculation example.

FIG. 16 shows a calculation model in the simulation. FIG. 17 shows an electric field intensity distribution in the simulation in the calculation example. As shown in FIG. 16, the calculation model expands infinitely in the X and Y directions. However, in an actual calculation, the calculation was carried out for one period of the incident plane wave as shown in FIG. 17. This was equivalent to an infinite periodic structure because a periodic boundary condition was set. At the incident end face, the modulation of an electric field E according to the equation below $$E = 2A \cos(\omega t)\{\cos(\pi x/2 + \pi y/2) + \cos(\pi x/2 - \pi y/2)\}$$

prepared by superposing the above-noted four wavelengths and setting z=0 was set as the boundary condition.

As the result of the simulation, the electric field intensity distribution is shown in FIG. 17. Black parts indicate a strong electric field, numeral 174 denotes a crest of the electric field, and numeral 173 denotes a trough of the electric field. In the following, the electric field pattern shown in FIG. 17 will be described. In the XY plane, a central cylinder is the crest of the electric field, and cylinders at four corners (shown partially in the figure) are troughs thereof. The electric field is localized in the cylindrical portions in the materials 15a and weakens in the portion of the material 15b. There is a characteristic in that the adjacent cylinders (the materials 15a) have phases that are shifted by half a period, which indicates that the propagation in higher-order bands is present.

Comparative Example

Next, using the same model as the above-described calculation example, a simulation was performed in the case where the incident light was a single plane wave in the Z-axis direction. The electric field E at the incident end face was expressed by $$E = 2A \cos(\omega t)$$

and was uniform in the XY plane.

Figure 18:
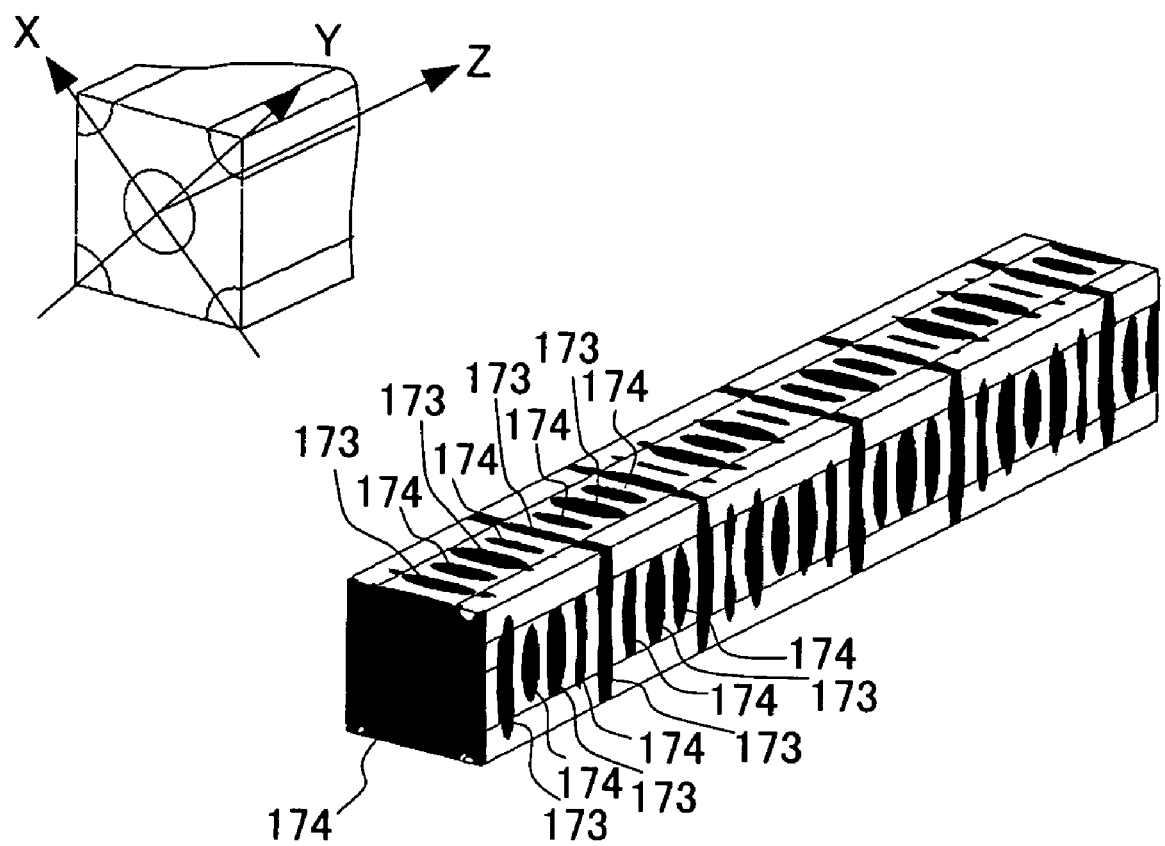
FIG. 18 shows an electric field intensity distribution in a simulation in a comparative example.

FIG. 18 shows an electric field intensity distribution in the simulation in the comparative example. In FIG. 18, black parts indicate a strong electric field, numeral 174 denotes a crest of the electric field, and numeral 173 denotes a trough of the electric field. The electric field intensity distribution obtained by the simulation shown in FIG. 18 showed that the electric field pattern was complicated and the propagations in a plurality of bands were superposed. Further, it was shown to be in phase in the XY plane.

As described above, the waveguide element using the photonic crystal according to the present embodiment can be used as an optical waveguide element utilizing higher-order band propagation light in a photonic crystal. Thus, it is widely applicable as optical elements utilizing a dispersion compensation and an effect of increased optical non-linearity due to a group velocity anomaly of the higher-order band propagation light. Moreover, since the waveguide element using the photonic crystal according to the present embodiment is capable of controlling electromagnetic waves at all wavelengths, it can be used not only as an optical element but as an electromagnetic wave control element.

INDUSTRIAL APPLICABILITY

A waveguide element using a photonic crystal according to the present invention can be used as an electromagnetic wave control element for a wide wavelength range.

The invention claimed is:

1. A waveguide element using a photonic crystal, the waveguide element comprising:
    a core formed of a photonic crystal having a refractive index periodicity in at least two directions perpendicular to a propagation direction of an electromagnetic wave; and
    a cladding arranged in contact with the core in order to confine the electromagnetic wave in the core;
    wherein an incident side phase modulation portion is provided for allowing an electromagnetic wave that is coupled to a band on or near a Brillouin zone boundary in a photonic band structure in the core and propagates in the core to enter the core.

2. The waveguide element using a photonic crystal according to claim 1, wherein the incident side phase modulation portion allows the electromagnetic wave that entirely or mostly belongs to a single photonic band and propagates in the core to enter the core.

3. The waveguide element using a photonic crystal according to claim 1, wherein the photonic crystal serving as the core has no refractive index periodicity in the propagation direction of the electromagnetic wave.

4. The waveguide element using a photonic crystal according to claim 1, wherein the incident side phase modulation portion allows a substantially plane wave having an inclination angle with respect to an incident surface of the core to enter the core.

5. The waveguide element using a photonic crystal according to claim 1, wherein an incident surface of the core is inclined with respect to a plane perpendicular to the propagation direction of the electromagnetic wave, and the incident side phase modulation portion allows a substantially plane wave to enter the core.

6. The waveguide element using a photonic crystal according to claim 1, wherein, at an incident surface of the core, the incident side phase modulation portion allows the electromagnetic wave subjected to a phase modulation periodically into an in plane direction parallel with the incident surface to enter the core.

7. The waveguide element using a photonic crystal according to claim 6, wherein the incident side phase modulation portion allows a plurality of substantially plane waves to enter the incident surface of the core and allows the plurality of substantially plane waves to interfere with each other at the incident surface, thereby allowing the electromagnetic wave subjected to the phase modulation to enter the core.

8. The waveguide element using a photonic crystal according to claim 6, wherein the incident side phase modulation portion comprises
    a phase grating disposed at a position close to or in contact with the incident surface of the core, and
    an incident portion for allowing an electromagnetic wave to enter the phase grating.

9. The waveguide element using a photonic crystal according to claim 8, wherein the phase grating is formed as one piece with the core.

10. The waveguide element using a photonic crystal according to claim 1, further comprising an exit side phase modulation portion disposed at a position close to or in contact with an exit surface of the core from which an electromagnetic wave exits,
    wherein the exit side phase modulation portion converts the electromagnetic wave that exits from the core into a substantially plane wave.

11. The waveguide element using a photonic crystal according to claim 10, wherein the exit side phase modulation portion is formed as one piece with the core.

12. The waveguide element using a photonic crystal according to claim 10, wherein the exit side phase modulation portion has an identical structure with the incident side phase modulation portion and is disposed such that a positional relationship between incident and exit ends of the exit side phase modulation portion is reversed from that of the incident side phase modulation portion.

13. The waveguide element using a photonic crystal according to claim 1, wherein the cladding is a photonic crystal having a refractive index periodicity in at least one direction perpendicular to the propagation direction of the electromagnetic wave propagating in the core.

14. The waveguide element using a photonic crystal according to claim 13, wherein the cladding is the photonic crystal having no refractive index periodicity in the propagation direction of the electromagnetic wave propagating in the core.

15. The waveguide element using a photonic crystal according to claim 1, wherein a waveguide portion constituted by the core and the cladding has a structure in which a plurality of parallel grooves are formed in a multilayered body having a plurality of periods, and
    the grooves are perpendicular to each layer in the multilayered body and run along the propagation direction of the electromagnetic wave.

16. The waveguide element using a photonic crystal according to claim 1, wherein the core is a homogeneous material in which a plurality of cavities extending along the propagation direction of the electromagnetic wave are formed, and
    the cavities are arranged so as to have a constant period in a plane perpendicular to the propagation direction of the electromagnetic wave.

17. The waveguide element using a photonic crystal according to claim 16, wherein all or some of the plurality of cavities are filled with a fluid material.

18. The waveguide element using a photonic crystal according to claim 16, wherein all or some of the plurality of cavities are filled with an active material having an optical nonlinear effect.

19. The waveguide element using a photonic crystal according to claim 16, wherein the core has a fiber shape with a substantially circular crosssection.

* * * * *